US012736042B2

(12) United States Patent
Nespor et al.

(10) Patent No.: US 12,736,042 B2
(45) Date of Patent: Sep. 15, 2026

(54) MECHANICAL DESIGN OF ELECTRO-HYDRODYNAMIC AIR MOVER APPARATUS

(71) Applicant: Ventiva, Inc., Fremont, CA (US)

(72) Inventors: Jeffrey S. Nespor, Pleasanton, CA (US); Gary A. Oliverio, San Jose, CA (US); Himanshu Pokharna, Saratoga, CA (US); Denis Finbarr O'Connell, Palo Alto, CA (US); Srikanth Ganesan, Fremont, CA (US); Collin Connors, San Jose, CA (US); Robert Haden Garrett, San Francisco, CA (US)

(73) Assignee: Ventiva, Inc., Fremont, CA (US)

( * ) Notice: Subject to any disclaimer, the term of this patent is extended or adjusted under 35 U.S.C. 154(b) by 0 days.

(21) Appl. No.: 19/349,903

(22) Filed: Oct. 3, 2025

(65) Prior Publication Data

US 2026/0098526 A1 Apr. 9, 2026

Related U.S. Application Data

(60) Provisional application No. 63/741,706, filed on Jan. 3, 2025, provisional application No. 63/741,715, filed (Continued)

(51) Int. Cl.
*F04B 39/12* (2006.01)
*F04B 37/00* (2006.01)

(Continued)

(52) U.S. Cl.
CPC ............ *F04B 39/121* (2013.01); *F04B 37/00* (2013.01); *F04B 39/06* (2013.01); *F28F 13/16* (2013.01); *H01J 9/00* (2013.01); *H01J 2209/017* (2013.01)

(58) Field of Classification Search
CPC ........ F04B 37/00; F04B 37/10; F04B 19/006; F28F 13/16; H01T 19/00; H01T 23/00

(Continued)

(56) References Cited

U.S. PATENT DOCUMENTS 3,312,840 A 4/1967 Dennis
3,665,241 A 5/1972 Spindt et al.

(Continued)

FOREIGN PATENT DOCUMENTS

CN 105723820 A 6/2016
CN 110708918 A 1/2020

(Continued)

OTHER PUBLICATIONS

Climalife. "R-134a." Datasheet, Climalife Dehon Service SA, 2015, 2 pages, [Online] [Retrieved Dec. 12, 2025], Retrieved from the Internet URL:https://climalife.com/documentation?filter=&documentation_id=1&post_id=116001.

(Continued)

*Primary Examiner* — Kenneth J Hansen

(74) *Attorney, Agent, or Firm* — Wilson Sonsini Goodrich & Rosati

(57) ABSTRACT

Embodiments of the present disclosure are directed to an electro-hydrodynamic air mover apparatus that includes a pair of isolators, a collector electrode, an emitter electrode, and a pair of conductive metal terminals. Each end of the collector electrode and each end of the emitter electrode are attached to a respective isolator of the pair of isolators. Each conductive metal terminal is placed in a slot of the respective isolator and is electrically connected to the emitter electrode. Each conductive metal terminal is configured for applying a respective voltage of a power supply. A distance from the emitter electrode to the collector electrode along an outer surface of each isolator is equal to or greater than a threshold (Continued)

202 distance set to prevent an electrical arcing between the collector electrode and the emitter electrode.

21 Claims, 13 Drawing Sheets

Related U.S. Application Data on Jan. 3, 2025, provisional application No. 63/704,506, filed on Oct. 7, 2024.

(51) Int. Cl.
*F04B 39/06* (2006.01)
*F28F 13/16* (2006.01)
*H01J 9/00* (2006.01)

(58) Field of Classification Search
USPC .............................................. 417/48; 361/320
See application file for complete search history.

(56) References Cited

U.S. PATENT DOCUMENTS

| | | | |
|---|---|---|---|
| 4,220,195 | A | 9/1980 | Borgoyn et al. |
| 5,071,526 | A | 12/1991 | Pletcher et al. |
| 5,210,940 | A | 5/1993 | Kawakami et al. |
| 6,038,120 | A * | 3/2000 | May ........................ H01T 19/00 250/324 |
| 6,101,994 | A | 8/2000 | Ichikawa |
| 6,900,077 | B2 | 5/2005 | Akram |
| 7,199,993 | B2 * | 4/2007 | Kato ........................ F24F 8/192 361/231 |
| 7,279,846 | B2 | 10/2007 | Gofuku et al. |
| 10,978,881 | B2 | 4/2021 | Schlachte et al. |
| 2002/0075655 | A1 | 6/2002 | Chen et al. |
| 2002/0122728 | A1 | 9/2002 | Darabi et al. |
| 2005/0068726 | A1 | 3/2005 | Pleskach et al. |
| 2006/0169441 | A1 | 8/2006 | Schlitz |
| 2006/0203416 | A1 | 9/2006 | Taylor et al. |
| 2007/0034356 | A1 | 2/2007 | Kenny et al. |
| 2008/0175720 | A1 * | 7/2008 | Schlitz .................... F04D 33/00 417/48 |
| 2009/0056916 | A1 | 3/2009 | Yesin et al. |
| 2009/0084335 | A1 | 4/2009 | Goldin et al. |
| 2009/0195983 | A1 | 8/2009 | Reichert et al. |
| 2009/0260782 | A1 | 10/2009 | Whitney et al. |
| 2009/0308081 | A1 | 12/2009 | Ouyang et al. |
| 2010/0116464 | A1 | 5/2010 | Jewell-Larsen et al. |
| 2010/0177519 | A1 | 7/2010 | Schlitz |
| 2010/0203273 | A1 | 8/2010 | Holland et al. |
| 2011/0084611 | A1 | 4/2011 | Schlitz et al. |
| 2011/0094710 | A1 | 4/2011 | Choudhary et al. |
| 2011/0102963 | A1 | 5/2011 | Sekoguchi |
| 2011/0116205 | A1 | 5/2011 | Schlitz |
| 2011/0174468 | A1 * | 7/2011 | Lu ............................ G06F 1/20 165/133 |
| 2011/0261499 | A1 | 10/2011 | Hizer et al. |
| 2011/0274459 | A1 | 11/2011 | Sugiyama |
| 2011/0292560 | A1 | 12/2011 | Jewell-Larsen et al. |
| 2011/0308768 | A1 | 12/2011 | Schwiebert et al. |
| 2012/0002342 | A1 | 1/2012 | Lee et al. |
| 2012/0007742 | A1 | 1/2012 | Gooch et al. |
| 2012/0008249 | A1 | 1/2012 | Sawyer et al. |
| 2012/0057356 | A1 | 3/2012 | Hizer et al. |
| 2012/0097028 | A1 | 4/2012 | Lee |
| 2012/0120542 | A1 | 5/2012 | Zhang et al. |
| 2012/0121487 | A1 | 5/2012 | Jewell-Larsen et al. |
| 2012/0162903 | A1 | 6/2012 | Macdonald et al. |
| 2013/0271990 | A1 | 10/2013 | Hussell et al. |
| 2014/0003964 | A1 | 1/2014 | Jewell-Larsen et al. |
| 2014/0090403 | A1 | 4/2014 | Pearson et al. |
| 2014/0097722 | A1 | 4/2014 | Jewell-Larsen et al. |
| 2014/0130675 | A1 | 5/2014 | Marra |
| 2015/0003015 | A1 | 1/2015 | Kulkarni et al. |
| 2015/0219874 | A1 | 8/2015 | Figueredo |
| 2015/0314033 | A1 | 11/2015 | Gurman |
| 2016/0175850 | A1 | 6/2016 | Peczalski et al. |
| 2016/0298617 | A1 | 10/2016 | Thorslund et al. |
| 2016/0377328 | A1 | 12/2016 | Hurbi |
| 2017/0170688 | A1 | 6/2017 | Maniktala |
| 2018/0206362 | A1 | 7/2018 | Vadillo et al. |
| 2019/0050097 | A1 | 2/2019 | Mugiraneza |
| 2019/0052104 | A1 | 2/2019 | Schlachte et al. |
| 2019/0217513 | A1 | 7/2019 | Bustle et al. |
| 2020/0291232 | A1 | 9/2020 | Piotrowski et al. |
| 2022/0210945 | A1 | 6/2022 | Vadillo et al. |
| 2022/0320833 | A1 | 10/2022 | Oliverio et al. |
| 2022/0344137 | A1 | 10/2022 | Vadillo et al. |
| 2024/0190254 | A1 | 6/2024 | Jeong et al. |

FOREIGN PATENT DOCUMENTS

| | | | |
|---|---|---|---|
| JP | H02192595 | A | 7/1990 |
| JP | 2000222072 | A | 8/2000 |
| JP | 2016219747 | A | 12/2016 |
| JP | 2019506123 | A | 2/2019 |
| JP | 2024051451 | A | 4/2024 |
| KR | 101361036 | B1 | 2/2014 |
| WO | WO-2020223300 | A1 | 11/2020 |
| WO | WO-2022212349 | A1 | 10/2022 |
| WO | WO-2022216475 | A1 | 10/2022 |
| WO | WO-2022226245 | A1 | 10/2022 |

OTHER PUBLICATIONS

PCT/US2020/030397 International Search Report and Written Opinion dated Sep. 11, 2020.
PCT/US2020/030397 Invitation to Pay Additional Fees dated Jul. 14, 2020.
PCT/US2022/022311 International Search Report and Written Opinion dated Aug. 30, 2022.
PCT/US2022/022311 Invitation to Pay Additional Fees dated Jun. 24, 2022.
PCT/US2022/025845 International Preliminary Report on Patentability dated Nov. 2, 2023.
PCT/US2022/025845 International Search Report and Written Opinion Jul. 28, 2022, 32 pages.
U.S. Appl. No. 17/607,154 Office Action dated May 17, 2024.
U.S. Appl. No. 17/607,154 Office Action dated Nov. 5, 2024.
U.S. Appl. No. 17/735,084 Office Action dated Mar. 26, 2025.
U.S. Appl. No. 17/735,084 Office Action dated Sep. 5, 2025.
U.S. Appl. No. 17/735,076 Office Action dated Jun. 5, 2024.
U.S. Appl. No. 17/735,076 Office Action dated May 30, 2025.
U.S. Appl. No. 17/735,076 Office Action dated Oct. 7, 2024.
PCT/US2025/049527 International Search Report and Written Opinion dated Dec. 4, 2025.
PCT/US2025/049529 International Search Report and Written Opinion dated Jan. 22, 2026.
U.S. Appl. No. 17/735,084 Office Action dated Jan. 30, 2026.

* cited by examiner

100

420

MECHANICAL DESIGN OF ELECTRO-HYDRODYNAMIC AIR MOVER APPARATUS

CROSS REFERENCE TO RELATED APPLICATIONS

This application claims a benefit and priority to U.S. Provisional Patent Application Ser. No. 63/704,506, filed on Oct. 7, 2024, and U.S. Provisional Patent Application Ser. No. 63/741,706, filed on Jan. 3, 2025, each of which is hereby incorporated by reference in its entirety.

BACKGROUND

An electro-hydrodynamic (EHD) air mover device, also known as an ionic fluid mover or ionic air mover, is an electronic device that in a normal operation induces movement of air (or, more generally, fluid—gas or liquid) that surrounds the EHD air mover device, utilizing electromagnetic force to create the air flow without the use of mechanically moving components. This air flow can be referred to as an ionic wind. EHD air mover devices can be installed within larger electronic devices to provide a cooling airflow without the noise or vibration typically caused by mechanical air movers like axial fans. An EHD air mover device typically includes one or more emitter electrodes (or anodes), and one or more collector electrodes (or cathodes), where the emitter and collector electrodes are separated by a physical gap. In the normal operation of the EHD air mover device, a sufficiently large voltage is applied to an emitter electrode, while a collector electrode is maintained at a neutral or ground electrical state and positioned with an air gap separating the emitter from collector electrodes. In this manner, an electrical field gradient is created between emitter and collector electrodes which is strong enough to partially ionize some fluid molecules surrounding the emitter (e.g., air) to create a plasma in the region of the emitter electrode, referred to as a corona discharge.

SUMMARY

Embodiments of the present disclosure are directed to a mechanical design of an electro-hydrodynamic (EHD) air mover apparatus such that arcing between electrodes of the EHD air mover apparatus is prevented.

In accordance with one or more embodiments of the present disclosure, the EHD air mover apparatus includes a pair of isolators made of one or more non-conductive materials, a collector electrode, an emitter electrode, a first conductive metal terminal, and a second conductive metal terminal. In some embodiments, a first end of the collector electrode is attached to a first isolator of the pair of isolators, a second end of the collector electrode is attached to a second isolator of the pair of isolators, and the first end of the collector electrode is opposite to the second end of the collector electrode along a first direction. In some embodiments, a first end of the emitter electrode is attached to the first isolator, a second end of the emitter electrode is attached to the second isolator, the first end of the emitter electrode is opposite to the second end of the emitter electrode along the first direction, and a distance from the emitter electrode to the collector electrode along a second direction orthogonal to the first direction is equal to or greater than a threshold distance set to prevent an electrical arcing between the collector electrode and the emitter electrode. In some embodiments, the first conductive metal terminal is placed in a slot of the first isolator and is electrically connected to the first end of the emitter electrode. In some embodiments, the first conductive metal terminal is configured for applying a first voltage of a power supply. In some embodiments, the second conductive metal terminal is placed in a slot of the second isolator and is electrically isolated from other parts of the system. In some embodiments, the second conductive metal terminal is configured for establishing a firm mechanical fix within the system and allows the emitter electrode to maintain both tension and uniform distance between emitter electrode and collector electrode along the length of each structure.

DETAILED DESCRIPTION

Introduction

A state of an impeded EHD air mover device operation may occur when the desired ionic flow ceases, which occurs when the normal positive ion flow from the emitter electrode to the collector electrode is dominated by a sudden electron flow (i.e., electrical current) between the emitter electrode and the collector electrode, known as an arc, spark, or short circuit. During such an arc event, the relative voltage differential between the emitter electrode and the collector electrode collapses due to the low impedance of an arc, which in turn would stop the corona discharge, and thus no ionic pressure head or flow is created by the device during such arcing state. Therefore, to allow for the stable control of the electrical field and mitigate the risk of arcing within the EHD air mover device, a minimum gap or distance between any portion of an emitter electrode and the nearest collector electrode needs to be maintained at a precise distance.

However, there is a technical problem of achieving a small form factor of an EHD air mover device (e.g., for installing the EHD air mover device in smaller electronic devices, such as tablet or laptop computers) while maintaining a necessary gap between an emitter electrode and a collector electrode required to avoid arcing.

Figure 1:
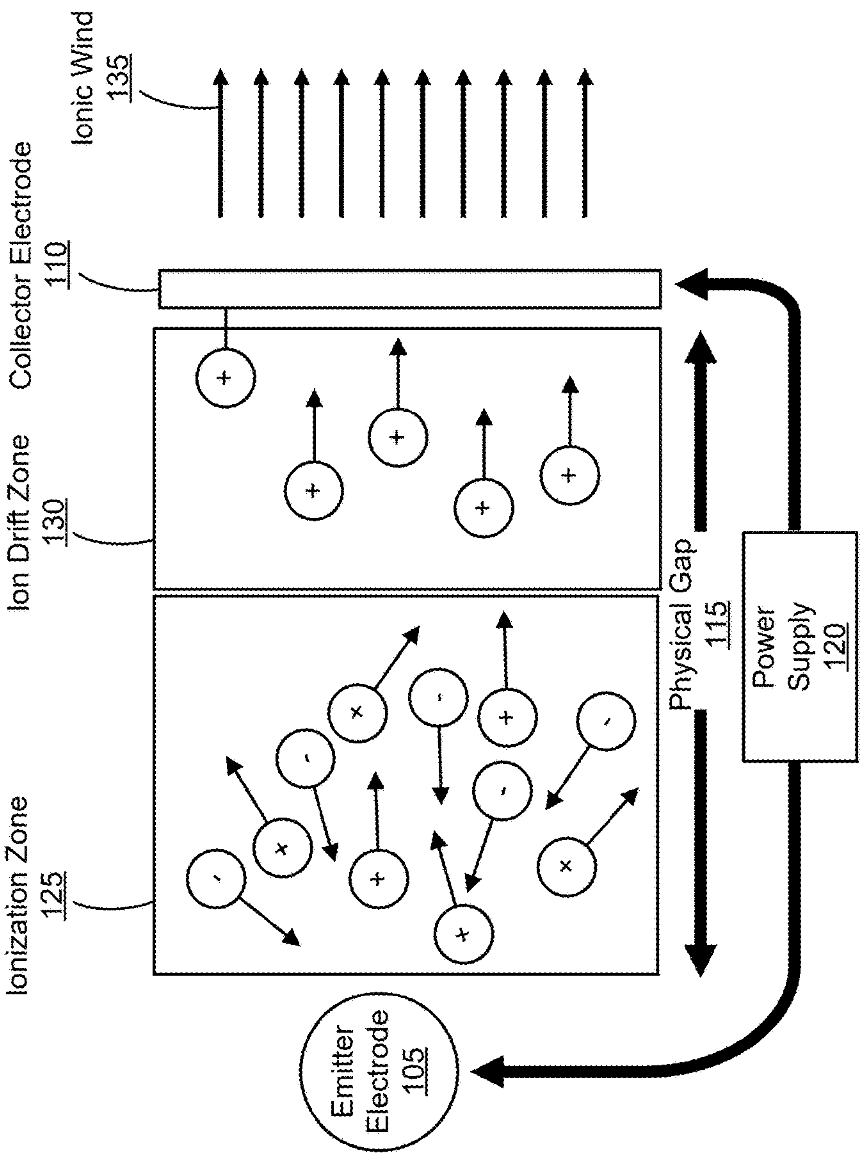
FIG. 1 illustrates a process of fluid movement in an electro-hydrodynamic (EHD) fluid mover device, in accordance with one or more embodiments.

FIG. 1 illustrates a process of fluid movement (e.g., air movement) in an electro-hydrodynamic (EHD) fluid mover device 100, in accordance with one or more embodiments. The process of fluid movement in the EHD fluid mover device 100 can be achieved without any moving parts of the EHD fluid mover device 100. The EHD fluid mover device 100, also known as an ionic fluid mover or ionic air mover, is an electronic device that in a normal operation induces movement of fluid molecules that surround the EHD fluid mover device 100, typically air but may also be other gases or liquids, utilizing electromagnetic force to create such flow without the use of mechanically moving components. This flow can be referred to as an ionic wind.

As shown in FIG. 1, the EHD fluid mover device 100 may include an emitter electrode 105 (or anode) and a collector electrode 110 (or cathode) separated by a physical gap 115, e.g., an air gap. The EHD fluid mover device 100 may further include a power supply 120 that provides an electrical power required for operation of the EHD fluid mover device 100. By applying a large differential voltage between the emitter electrode 105 and the collector electrode 110, an electrical field may be created between the emitter electrode 105 and the collector electrode 110. In one or more embodiments, a positive biased voltage of the power supply 120 is applied to the emitter electrode 105 (e.g., in the order of 2,500V to 8,000V), while the collector electrode 110 remains neutral or grounded. Alternatively, a negative biased voltage of the power supply 120 may be applied to the collector electrode 110.

The electrical field created in the physical gap 115 may need to be established and maintained at a sufficiently large magnitude to create an electrical field gradient between the emitter electrode 105 and the collector electrode 110 that is strong enough to partially ionize surrounding fluid molecules (e.g., air molecules) and create a plasma in a region in a vicinity of the emitter electrode 105, which is referred to as a corona discharge. The region having the partially ionized fluid molecules that create the corona discharge is illustrated in FIG. 1 as an ionization zone 125. It should be noted that the electrical field created in the physical gap 115 should be set not to be too large to exceed a dielectric resistance of the physical gap 115. Exceeding the dielectric resistance of the physical gap 115 by the electrical field would cause a sudden electrical current (e.g., arc or spark) between the emitter electrode 105 and the collector electrode 110 due to a short circuit established across the physical gap 115. Alternatively or additionally, exceeding the dielectric resistance of the physical gap 115 by the electrical field may cause a flow of electrical current along a surface of any non-conductive structure that is between the emitter electrode 105 and the collector electrode 110. This flow of electrical current can be referred to as an electrical creep, while a shortest path between any conductors of the EHD fluid mover device 100 can be referred to as a creep distance.

Ionized molecules (e.g., positively ionized molecules) created in the area of corona discharge (i.e., in the ionization zone 125) may be accelerated toward the collector electrode 110 via an electromagnetic force exerted by the electrical field. Hence, an ion drift zone 130 with the ionized molecules may be created in the vicinity of the collector electrode 110. Enroute to the collector electrode 110 and in the ion drift zone 130 the ionized molecules may collide with surrounding neutral fluid molecules and impart momentum on the neutral molecules, thus creating the net fluid movement which is detected as a pressure head and flow similar to that produced by a mechanical fan, which can be referred to as an ionic wind 135. The generated ions eventually pass their charge to nearby areas of lower potential or recombine to form neutral gas molecules again.

The corona discharge may be positive or negative, determined by the polarity of the voltage applied to each electrode of the EHD fluid mover device 100, which have different underlying properties associated with their respective predominant electrical bias (i.e., positive, or negative). In one or more embodiments, the EHD fluid mover device 100 in a normal operation utilizes a large positive voltage applied to the emitter electrode 105 (e.g., shaped as a wire), while the collector electrode 110 is neutral or ground, and thus creates a positive corona discharge. The positive corona discharge is strongly favored for normal operations of small-factor EHD fluid mover devices intended for use within confined volumes, such as internal to an electronic consumer device to create a cooling airflow. This is because, as compared to negative corona discharge, the positive corona discharge can be created in preferred small geometries and has other advantages such as a lower creation rate of ozone molecules when operating in the air.

The corona discharge can form at locations near the high voltage emitter electrode 105 where the electrical field potential gradient is the highest—at sharp points or at regions of small radii on the emitter electrode 105, such as sharp corners or edges, projecting points, or small diameter wires where the high curvature causes a high potential gradient at these locations. In one or more embodiments, the EHD fluid mover device 100 utilizes a small radius wire-type emitter electrode 105, so as to establish a corona discharge along the length of the wire electrode and thus induce ionic flow along the entire length dimension of the EHD fluid mover device 100 where the emitter electrode 105 is exposed to a surrounding fluid (e.g., air).

A state of an impeded operation of the EHD fluid mover device 100 may occur when the desired ionic flow within the physical gap 115 ceases, i.e., when the normal positive ion flow from the emitter electrode 105 to the collector electrode 110 is dominated by a sudden electron flow (i.e., electrical current) between the collector electrode 110 and the emitter electrode 105, which is known as an arc, spark, or short circuit. During such an arc event, the relative voltage differential between the emitter electrode 105 and the collector electrode 110 collapses due to the low impedance of an arc, which in turn would stop the coronal discharge, and thus no ionic pressure head or flow is created by the EHD fluid mover device 100 during such arcing state.

In the normal operation of the EHD fluid mover device 100, the electrical field must be maintained at a level strong enough to ionize molecules of the fluid near the emitter electrode 105 (i.e., to form the ionization zone 125), but below a natural dielectric breakdown voltage of the fluid in the physical gap 115 (e.g., approximately 3 kV/mm for air, or some other limit as determined by the dielectric breakdown of an alternate surrounding fluid), so as not to cause a current discharge or arc between the emitter electrode 105 and the collector electrodes 110 across the physical gap 115. Additionally, a minimum gap or distance between any portion of the emitter electrode 105 and a nearest portion of the collector electrode 110 needs to be maintained at a precise distance to allow for the stable control of the electrical field thus mitigating the risk of arcing.

Accordingly, specific factors need to be considered when designing the EHD fluid mover device 100, including but not limited to: (i) the precise mechanical positioning and physical stability of the emitter electrode 105 and the collector electrode 110 in relation to each other to maintain the desired distance between the emitter electrode 105 and the collector electrode 110, and thus enable predictable operation of the EHD fluid mover device 100 without any arcing; and (ii) the measurement and control of the power being supplied to the emitter electrode 105 to optimize a strength of the electrical field between the emitter electrode 105 and the collector electrode 110, as well as to mitigate and/or respond to changing conditions which can result in a changed likelihood of arcing.

As aforementioned, the operation of the EHD fluid mover device 100 requires establishing an electric field gradient between the emitter electrode 105 and the collector electrode 110, which can be achieved by applying a large differential voltage between the emitter electrode 105 and the collector electrode 110. For example, during the normal operation of the EHD fluid mover device 100, the emitter electrode 105 can typically have a voltage applied in the order of 2,500V to 5,000V, while the collector electrode 110 remains neutral or grounded. Due to the strong electrical field between the emitter electrode 105 and the collector electrode 110, the normal operation of the EHD fluid mover device 100 may require an isolation between the emitter electrode 105 and the collector electrode 110 to minimize or at least reduce inadvertent short circuits caused by the flow of electrical charge along the shortest path along the outer surface of an otherwise generally non-conductive material between two locations of high differential electrical potential (i.e., electrical creep). Containing the electrical field within a non-conductive housing, and/or robust grounding or shielding of all external conductive components near the EHD fluid mover device 100 may be required to eliminate the possibility of imparting a harmful electrical charge onto external device components near the EHD fluid mover device 100, which can lead to damaging short circuits or arcs between the high-voltage elements of the EHD fluid mover device 100 (e.g., the high-power boost stage of the power supply 120, or the emitter electrode 105 when operating under high voltage) and conductive external components within an electronic device in which the EHD fluid mover device 100 is installed.

To minimize or at least reduce a total power consumed by the EHD fluid mover device 100, so as to enable the EHD fluid mover device 100 to operate within a battery-powered electronic device without adversely affecting overall battery life as compared to a typical axial fan, the EHD fluid mover device 100 should consume no more than between 0.1 W and 3 W of the total power during the normal operation. At the required voltage and power levels for the normal operation of the EHD fluid mover device 100, the power supply 120 may need to be able to provide the voltage to the emitter electrode 105 in the order of 2,500V to 8,000V, and at an electrical current in the order of 10 uA to 1000 uA. To operate the EHD fluid mover device 100 in a typical consumer electronic device, an input power rail to the EHD fluid mover device 100 should be between 5V and 24V. Therefore, the power supply 120 needs to be able to accept a low voltage input in the order of 5V to 24V, output a high voltage very low current power, in the order of 2,500V to 8,000V at 60 mA to 600 mA, for a total power that is less than 3 W. Additionally, the power supply 120 may require to be dynamically controlled for adapting to detected rates of arcing caused by changes in the dielectric breakdown level of the air or other surrounding fluid in the physical gap 115, changes in a distance between the emitter electrode 105 and the collector electrode 110, contaminants on the emitter electrode 105 and the collector electrode 110 that may cause localized concentration of the electrical field, some other conditions that can lead to arcing, or some combination thereof.

Electro-Hydrodynamic Air Mover Apparatus

Figure 2A:
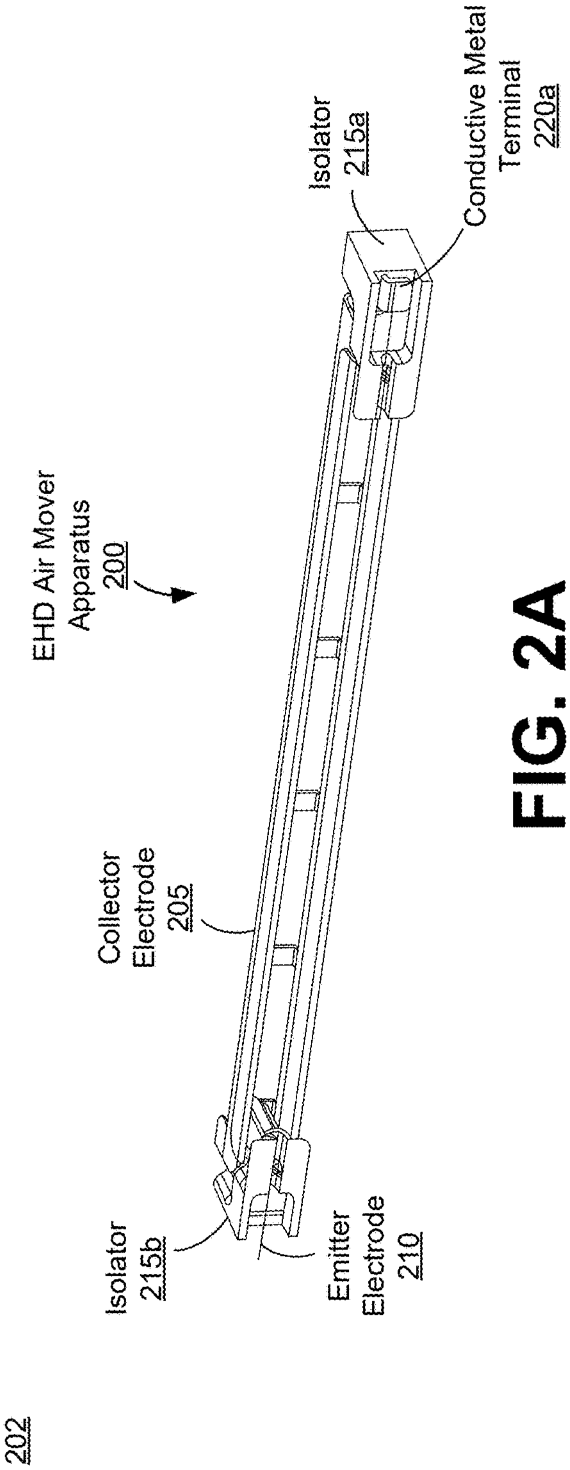
FIG. 2A illustrates a front view of an EHD air mover apparatus, in accordance with one or more embodiments.

FIG. 2A illustrates a front view 202 of an electro-hydrodynamic (EHD) air mover apparatus 200, in accordance with one or more embodiments. The EHD air mover apparatus 200 may include a collector electrode 205, an emitter electrode 210, an isolator 215*a*, and an isolator 215*b*. The EHD air mover apparatus 200 may include one or more additional components not shown in FIG. 2A. In general, the EHD air mover apparatus 200 may include features for mounting and aligning electrodes to optimize performance, including spring-loaded conductive terminals and structural end caps with ribs and lips for secure placement. The EHD air mover apparatus 200 may be an embodiment of the EHD fluid mover device 100.

The collector electrode 205 and the emitter electrode 210 may be attached to and held in a preferred position by the isolators 215*a*, 215*b*. The isolators 215*a*, 215*b* may be in the form of insulating end caps, located at longitudinal ends of the collector electrode 205 and the emitter electrode 210. The isolators 215*a*, 215*b* may be made of one or more non-conductive materials.

An air gap and spatial alignment between the collector electrode 205 and the emitter electrode 210 may be maintained by the isolators 215*a*, 215*b*. Precise positioning of the isolators 215*a*, 215*b* may ensure an adequate creep distance and air gap between the collector electrode 205 and the emitter electrode 210 in order to prevent electrical arcing within the EHD air mover apparatus 200. In this manner, the corona discharge and resulting ionic flow of the EHD air mover apparatus 200 can be more easily maintained at a desired power level without interruption by arcing that could result from the air gap distance between the collector electrode 205 and the emitter electrode 210 reduced below a threshold distance (e.g., creep distance) at any point in space or time.

Figure 2B:
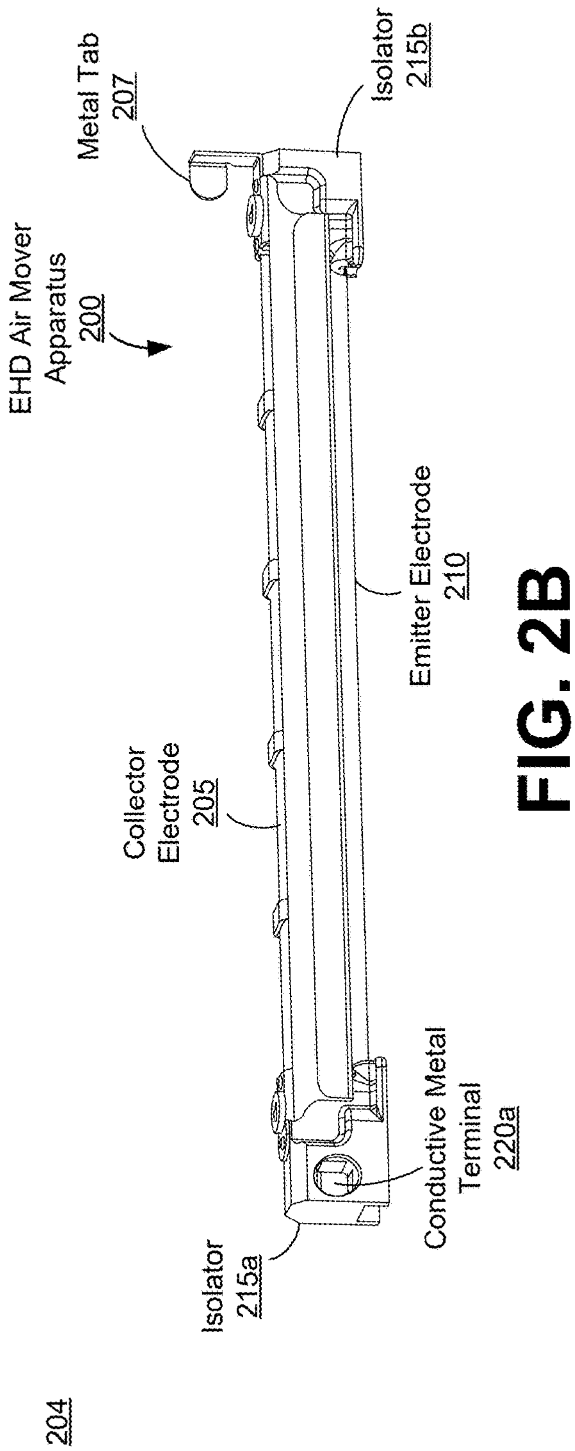
FIG. 2B illustrates a bottom view of an EHD air mover apparatus, in accordance with one or more embodiments.

FIG. 2B illustrates a bottom view 204 of the EHD air mover apparatus 200, in accordance with one or more embodiments. The isolator 215*a* may include a slot for a conductive metal terminal 220*a* (e.g., positive high-voltage terminal, or HV+ terminal). As shown in FIG. 2A, the isolator 215*b* may also include a slot for metal tab 207 (e.g., negative high-voltage terminal, or HV-terminal), or alternatively, the metal tab 207 may make contact with the spring loaded-contact external to and adjacent to the isolator 215*b*. Each slot for the corresponding conductive metal terminal 220*a*, 207 may have an access within the respective isolator 215*a*, 215*b* to allow access to at least two orthogonal surfaces of the corresponding conductive metal terminal 220*a*, metal tab 207.

The conductive metal terminal 220*a* may be utilized to attach one end of the emitter electrode 210 (e.g., wire) via a solder, weld, or other electrical and mechanical connection, and the conductive metal terminal 220*b* may be utilized to attach the other end of the emitter electrode 210 via another solder, weld, or other electrical and mechanical connection. At least one end of the collector electrode 205 may include a metal tab 207 extending in a direction away from the emitter electrode 210 and may be external to the isolator 215*b*, or integrated within the isolator 215*b*. The metal tab 207 may be used as an electrical contact point for the collector electrode 205 to the power supply (e.g., the negative high-voltage, or HV−).

Figure 2C:
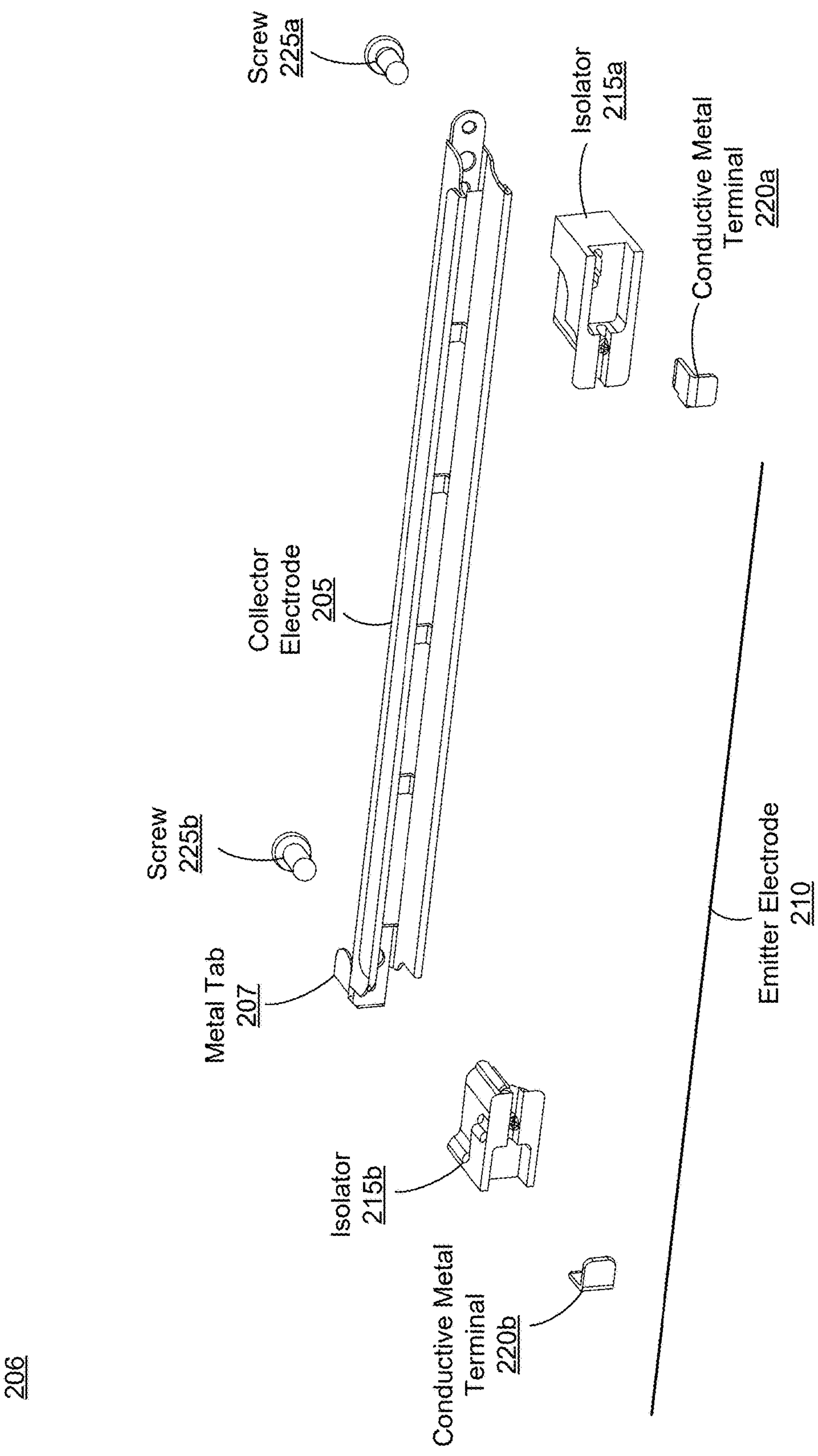
FIG. 2C illustrates a detailed view of components of an EHD air mover apparatus, in accordance with one or more embodiments.

FIG. 2C illustrates a detailed view 206 of components of the EHD air mover apparatus 200, in accordance with one or more embodiments. In addition to components shown in FIGS. 2A-2B, the EHD air mover apparatus 200 may further include a pair of screws 225*a*, 225*b*. The screw 225*a* may be used to connect the collector electrode 205 to the isolator 215*a*, and the screw 225*b* may be used to connect the collector electrode 205 to the isolator 215*b*. The emitter electrode 210 may be implemented as an emitter wire. One longitudinal end of the emitter electrode 210 may be connected to the conductive metal terminal 220*a* (e.g., positive high-voltage terminal, or HV+ terminal), and the other longitudinal end of the emitter electrode 210 may be connected to the conductive metal terminal 220*b* In some embodiments, isolators 215*a*, 215*b* may include curved surface regions with a minimum radius of 50 μm when located within 1 mm of the region between the collector electrode 205 and the emitter electrode 210. The shapes and dimensions of the isolators are configured to maintain a tangential electric field of less than 2 MV/m±50% at these locations. In some embodiments, a V-groove is formed in the isolator, and the V-groove may be configured to precisely position the emitter electrode wire relative to the collector electrode.

Each conductive metal terminal 220*a*, 220*b* may have a flat surface of a sufficient size. The flat surface of each conductive metal terminal 220*a*, 220*b* may be made of one or more conductive materials that facilitate firmly attaching a wire of the emitter electrode 210 to each conductive metal terminal 220*a*, 220*b* via a solder (not shown in FIG. 2C), weld, or other electrical and mechanical connection to hold the wire of the emitter electrode 210 in place and under an appropriate tension when the EHD air mover apparatus 200 is assembled. The tension may be applied to the emitter electrode prior to the solder, weld, or other means of attachment to Metal Terminals 220*a* and 220*b* in order to achieve the desired tension, or alternatively, a spring-loaded feature of the emitter terminal 220*b* may allow for the emitter electrode 210 to be mounted under minimal tension, and then after solder, weld, or other means of attachment, the tension applied to the Metal Terminal during attach process may be released and thus applied to the emitter electrode 210. The amount of tension may be sufficient to minimize or at least reduce sagging of the emitter electrode 210 and/or excess movement of the emitter electrode 210, which would alter the air gap distance from the collector electrode 205 to the emitter electrode 210 and potentially induce arcing within the EHD air mover apparatus 200.

Figure 2D:
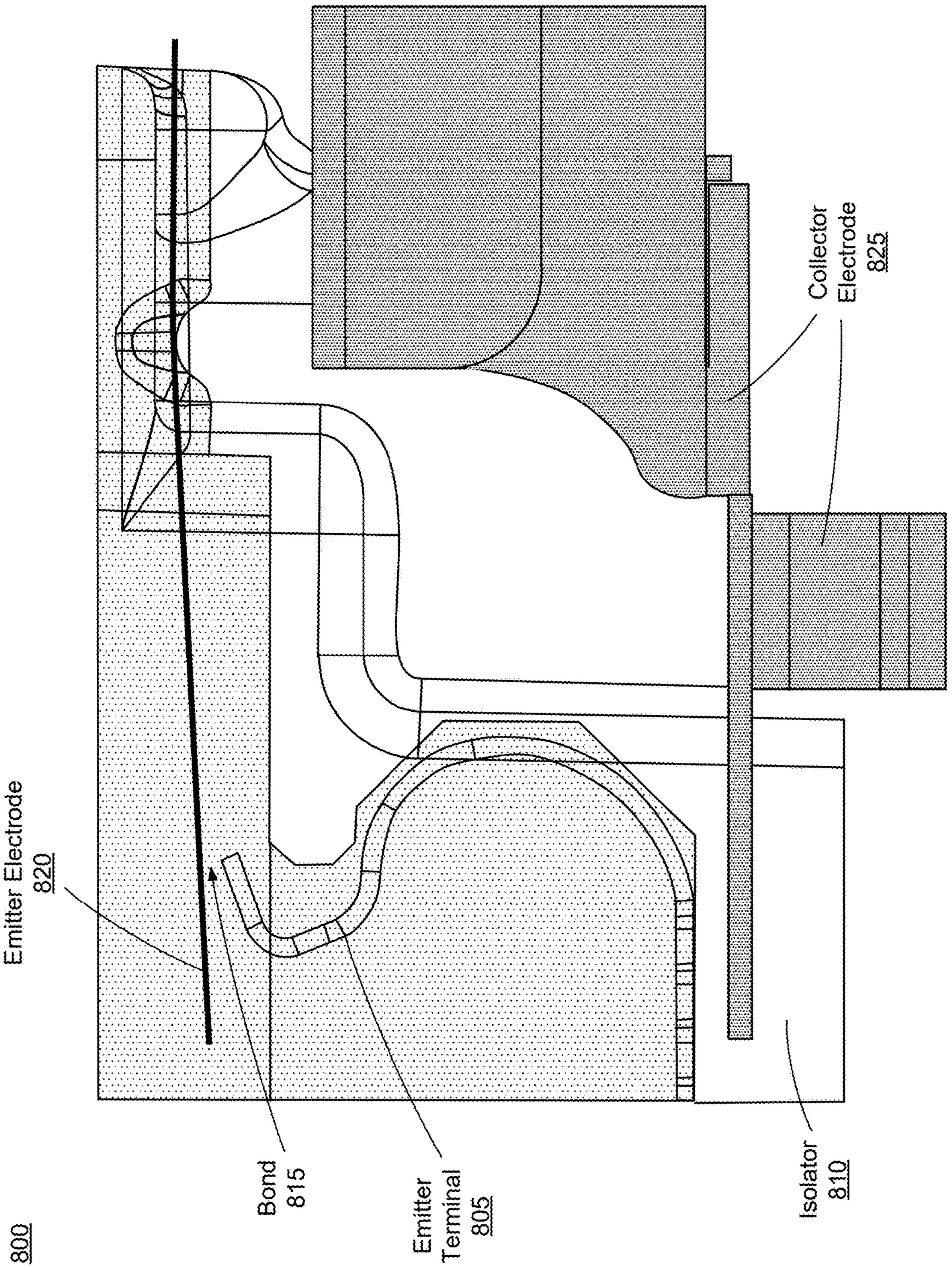
FIG. 2D is a cross-sectional view of an EHD air mover apparatus illustrating an embodiment in which an emitter terminal provides spring-loaded support and tensioning for the emitter electrode, in accordance with one or more embodiments.

In some embodiments, an emitter terminal may serve as an alternative implementation of the conductive metal terminals 220*a*, 220*b*. FIG. 2D illustrates an example embodiment, in which an emitter terminal 805 is configured to provide a spring force that positions the emitter electrode 820 during assembly. In such cases, a bond 815, which may include solder, weld, or other electromechanical attachment, is formed between the emitter terminal 805 and the emitter electrode 820 to secure the emitter electrode in place. A nominal tension force may be applied to the emitter terminal 805 and thereby transferred to the emitter electrode 820 once bonding is completed. The isolator 810 may provide sufficient dielectric separation between the emitter terminal 805-820 assembly and a collector electrode 825 to prevent electrical arcing due to insufficient clearance, FIG. 2D illustrates a cross-section view of an EHD air mover apparatus 800, in accordance with one or more embodiments. The EHD air mover apparatus 800 may be an embodiment of the EHD air mover apparatus 100 or the EHD air mover apparatus 200. In addition to the same components present in the EHD air mover apparatus 200, the EHD air mover apparatus 800 may include an emitter terminal 805 as an alternative implementation of conductive metal terminal 220*b* as shown in FIG. 2B.. This feature is formed to provide the spring tension to the emitter electrode after assembly. During the assembly process, emitter terminal 805 is pressed against Stop Point 835 (add reference within drawing)—what the heck is this trying to say??. A nominal tension force may be applied onto the Emitter Electrode 820 prior to attachment to emitter Terminal 805 via Bond 815, which may be via solder, weld, or other mechanical connection, to secure positioning of the emitter electrode 820 within the EHD air mover apparatus 800. Following successful bonding of Emitter Electrode 820 to Emitter Terminal 805, the tension force applied to Emitter Terminal 805 is released, and this tension is thus transferred to Emitter Electrode 820. The isolator 810 may secure a sufficient distance between the emitter terminal 805 and a collector electrode 825 to prevent arcing due to insufficient electrical creep or clearance.

Figure 3:
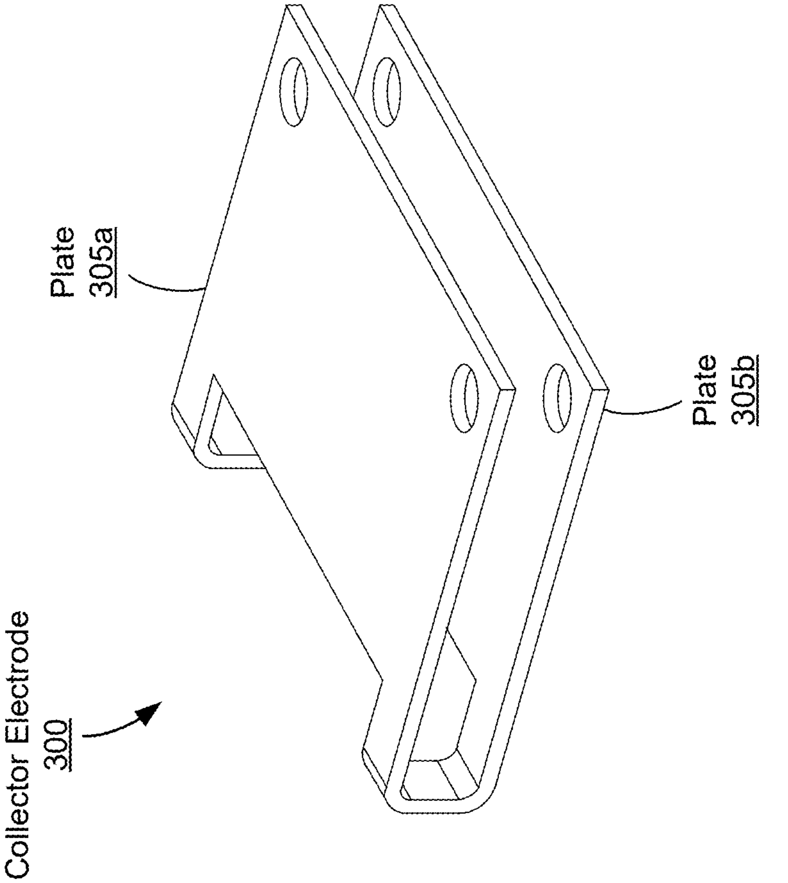
FIG. 3 illustrates an example collector electrode of an EHD air mover apparatus, in accordance with one or more embodiments.

FIG. 3 illustrates an example collector electrode 300 of the EHD air mover apparatus 200, in accordance with one or more embodiments. The collector electrode 300 may represent a "plate-style collector" that includes a pair of parallel plates 305*a* and 305*b*. The collector electrode 300 may be an embodiment of the collector electrode 205. The collector electrode 300 may be formed from one or more conductive materials (e.g., one or more metal materials). The collector electrode 300 may be formed in a U-shape so as to create parallel plates 305*a* and 305*b*, with the base of the U-shape open for most of its length to allow ionic flow to pass unimpeded while maintaining the structural integrity of the collector electrode 300. The one or more conductive materials of the collector electrode 300 may be folded back approximately 180° so as to expose a smoothly rounded leading edge toward a direction of the emitter electrode 210, thus avoiding sharp edges that would tend to concentrate the electrical field and cause preferential arcing in such locations. The specific shape of the collector electrode 300 shown in FIG. 3 that features folded edges helps preventing electrical field concentration and facilitates cleaning of the EHD air mover apparatus 200.

Figure 4A:
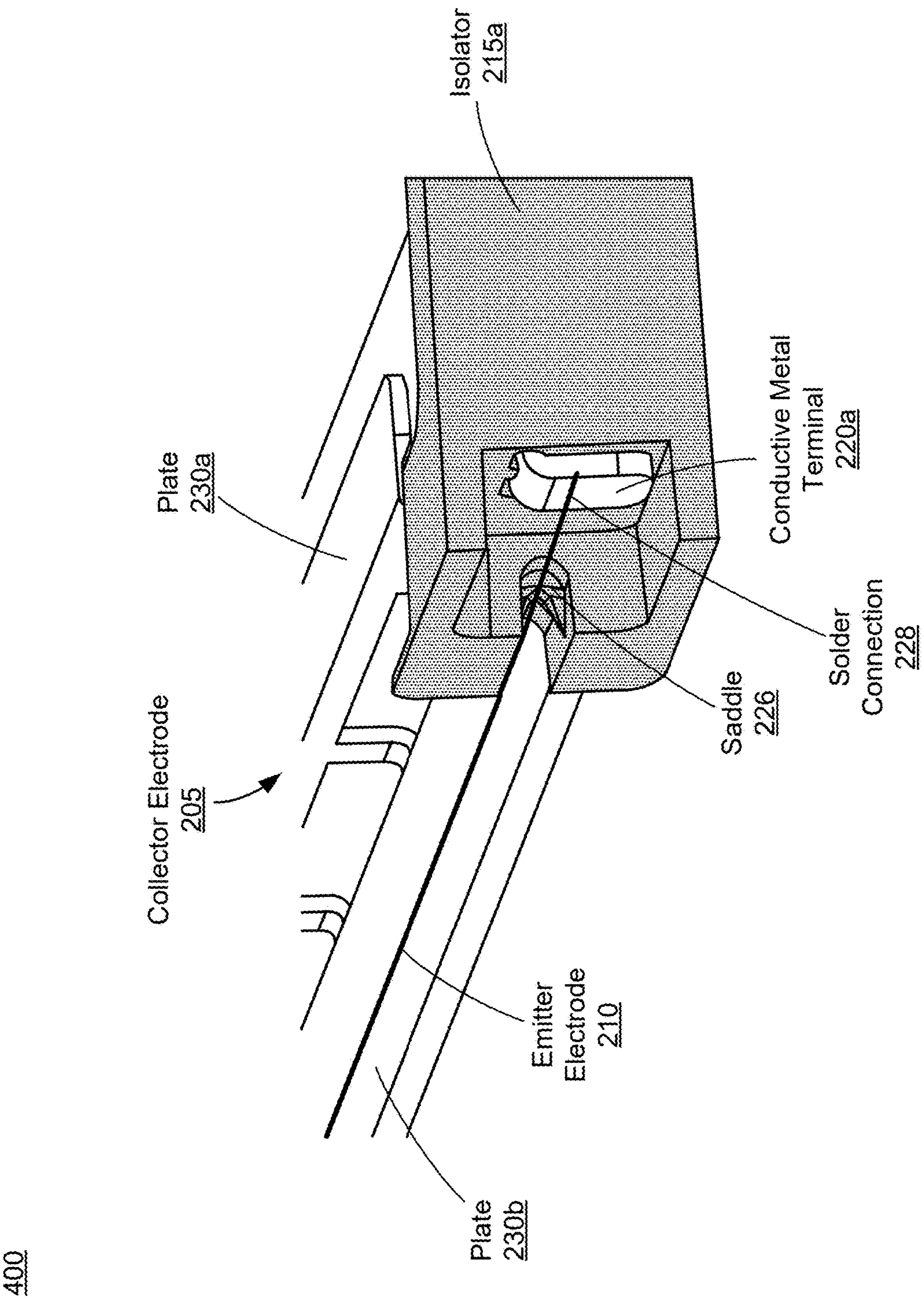
FIG. 4A illustrates a front angled view of an isolator of an EHD air mover apparatus, in accordance with one or more embodiments.

FIG. 4A illustrates a front angled view 400 of the isolator 215*a*, in accordance with one or more embodiments. The isolator 215*a* may include a slot for the conductive metal terminal 220*a* (e.g., positive high-voltage terminal, or HV+ terminal). A wire of the emitter electrode 210 may pass through a saddle 226 formed in the isolator 215*a* before making contact with the conductive metal terminal 220*a* via a solder connection 228. The wire of the emitter electrode 210 may be positioned within a threshold air gap distance from a plate 230*a* of the collector electrode 205 and a plate 230*b* of the collector electrode 205 to avoid arcing between the collector electrode 205 and the emitter electrode 210.

Figure 4B:
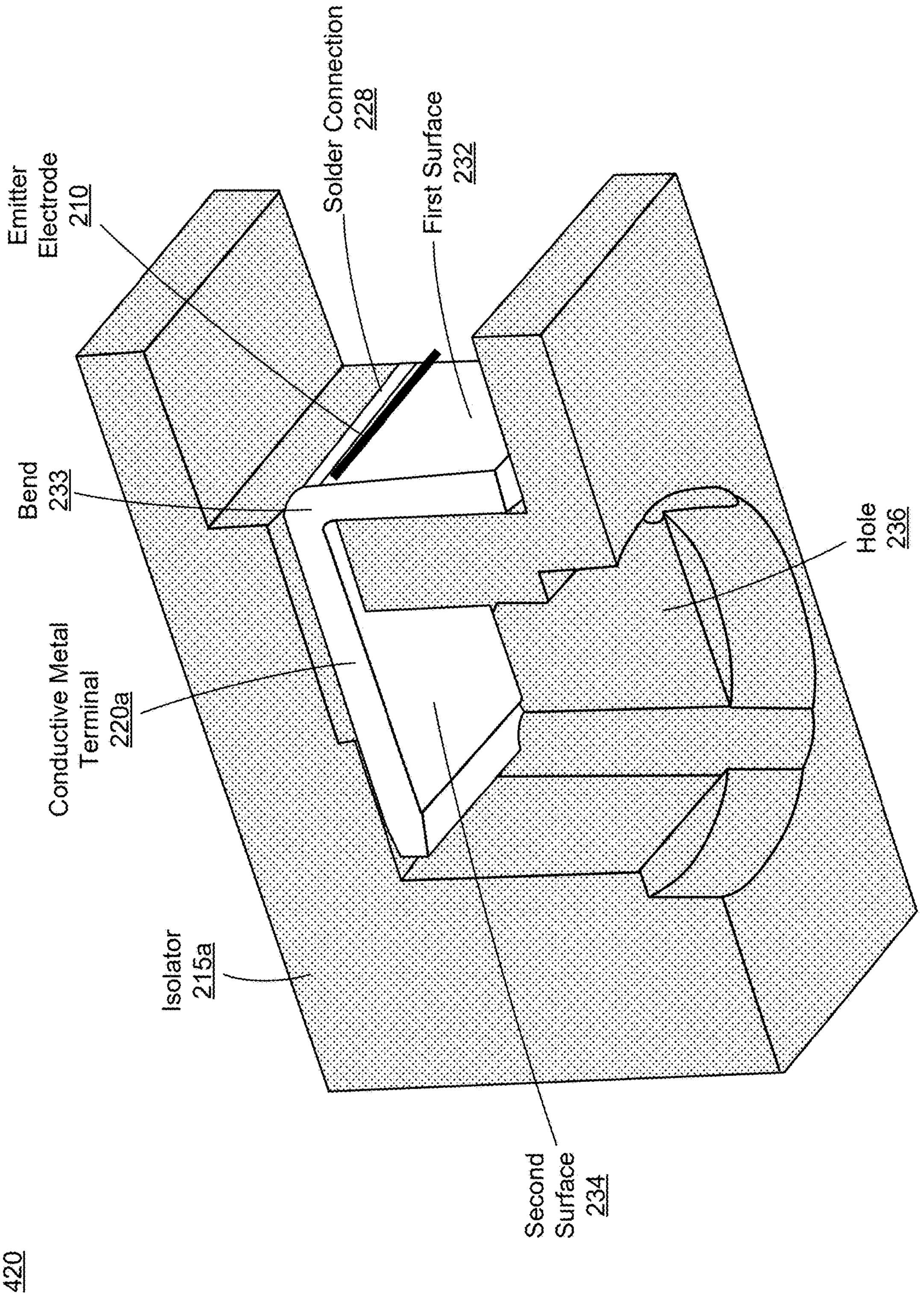
FIG. 4B illustrates a cross-section view of an isolator of an EHD air mover apparatus, in accordance with one or more embodiments.

FIG. 4B illustrates a cross-section view 420 of the isolator 215*a*, in accordance with one or more embodiments. The cross-section view 420 is a cut-away view of the isolator 215*a* that also shows the conductive metal terminal 220*a* (e.g., positive high-voltage terminal, or HV+ terminal). The conductive metal terminal 220*a* may include a first surface 232 featuring a location of the solder connection 228 for connecting the wire of the emitter electrode 210 to the conductive metal terminal 220*a*. The conductive metal terminal 220*a* (as well as the conductive metal terminal 220*b*) may have a bend 233 providing a second surface 234 of the conductive metal terminal 220*a* that is formed at an angle from the first surface 232. The second surface 234 of the conductive metal terminal 220*a* may be used as an electrical contact point to a power supply for providing a positive bias voltage to the emitter electrode 210. The second surface 234 of the conductive metal terminal 220*a* may allow the power supply to make the electrical connection with the wire of the emitter electrode 210 without disturbing the solder connection 228 on the first surface 232. A bottom side of the isolator 215*a* may include a hole 236 to allow access for the connection between the power supply and the conductive metal terminal 220*a*.

Figure 5A:
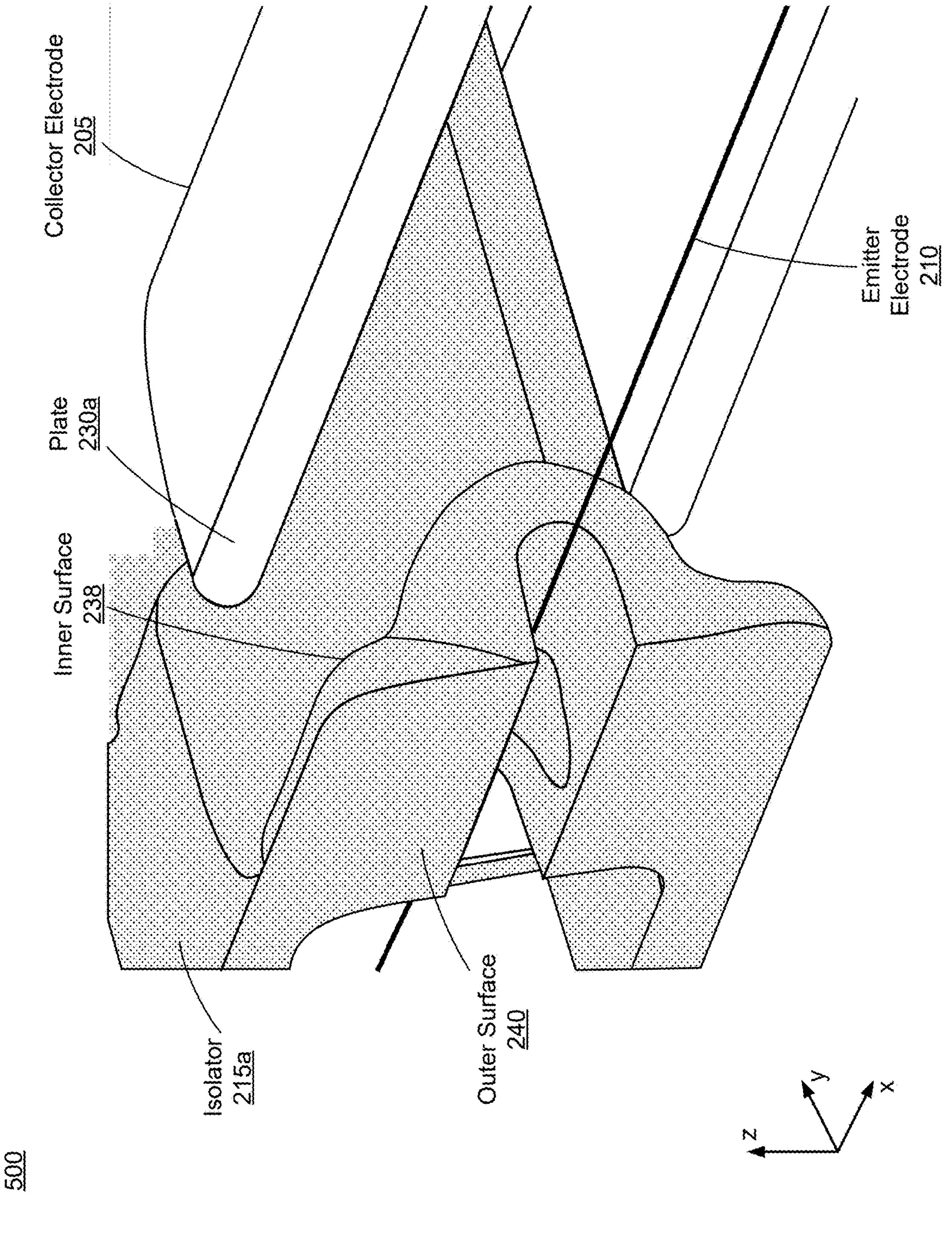
FIG. 5A illustrates an enlarged front angled view of an isolator of an EHD air mover apparatus, in accordance with one or more embodiments.

FIG. 5A illustrates an enlarged front angled view 500 of the isolator 215*a*, in accordance with one or more embodiments. The isolator 215*a* (as well as the isolator 215*b*) may be made without any sharp edges, corners, and/or points on an inner surface 238 of the isolator 215*a* that faces a gap between the emitter electrode 210 and the collector electrode 215. In this manner, the concentration of the electrical field in a close proximity of the inner surface 238 of the isolator 215*a* is avoided, which would otherwise result in undesired arcing. To avoid concentrating the electrical field that would cause arcing, a minimum distance along an outer surface 240 of the isolator 215*a* from the emitter electrode 210 to the collector electrode 205 (e.g., along the z axis) may need to exceed the creep distance at all desired operating voltage levels and power levels. Additionally, to avoid concentrating the electrical field that would cause arcing, a gap equal to or greater than a threshold gap (e.g., 0.3 mm) may need to be maintained between the plate 230*a* of the collector electrode 205 and the inner surface 238 of the isolator 215*a* along the z axis. Furthermore, to avoid concentrating the electrical field that would cause arcing, a clearance distance equal to or greater than a threshold distance (e.g., 0.8 mm) may need to be maintained between the plate 230*a* of the collector electrode 205 and the inner surface 238 of the isolator 215*a* along the y axis.

Figure 5B:
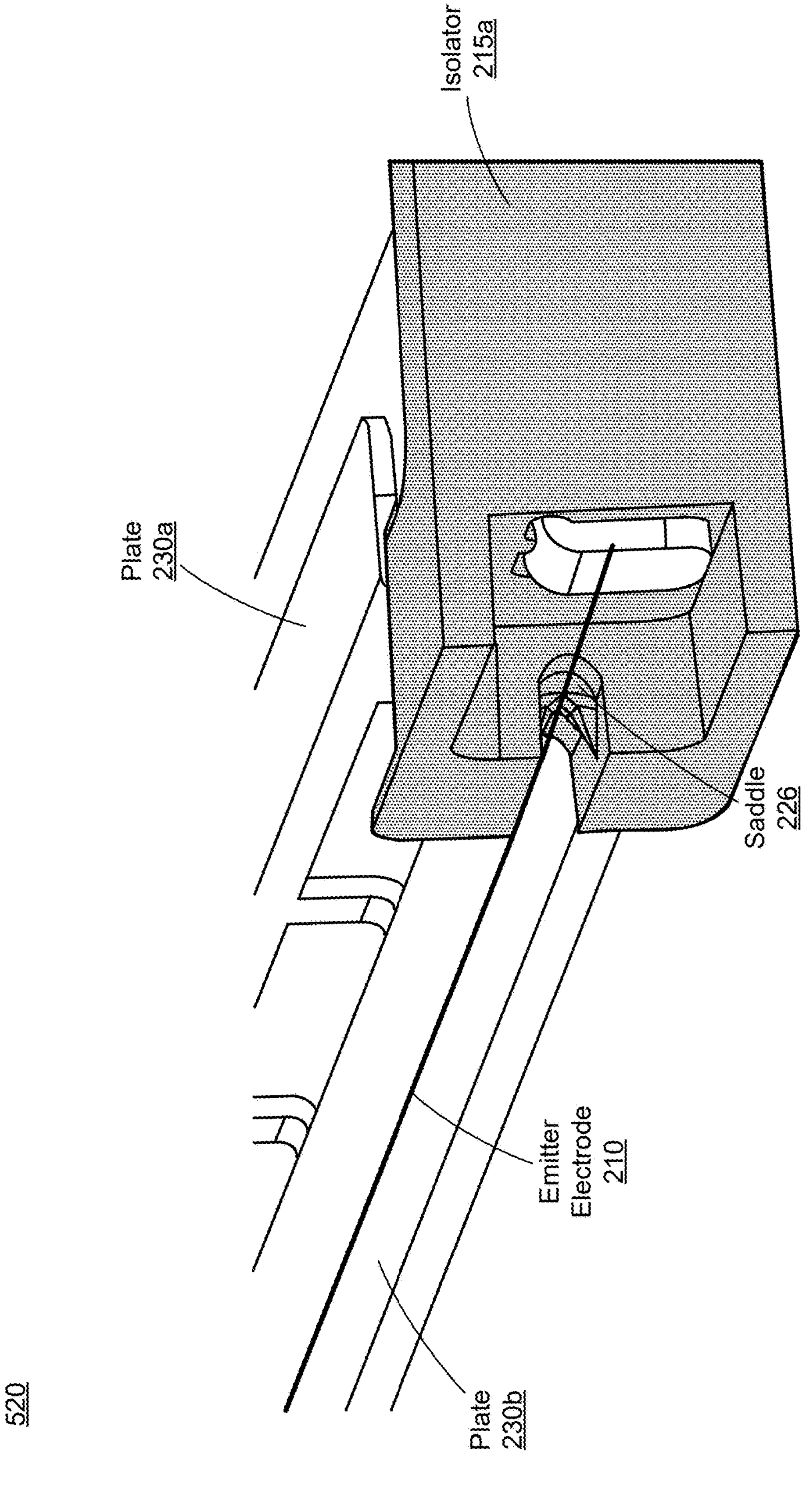
FIG. 5B illustrates another enlarged front angled view of an isolator of an EHD air mover apparatus, in accordance with one or more embodiments.

FIG. 5B illustrates an enlarged front angled view 520 of the isolator 215*a*, in accordance with one or more embodiments. The saddle 226 may be formed in the isolator 215*a* to hold the tensioned wire of the emitter electrode 210 centered in the EHD air mover apparatus 200 and equidistant from each of the plates 230*a*, 230*b* of the collector electrode 205. The saddle 226 may be formed using one or more non-conductive materials without any sharp edges in order to minimize or at least reduce the risk of localized electrical field build-up and subsequent arcing. Additionally, the saddle 226 may hold the wire of the emitter electrode 210 precisely centered in the desired position equidistant from parallel plates 230*a* and 230*b* of the collector electrode 205.

Figure 6A:
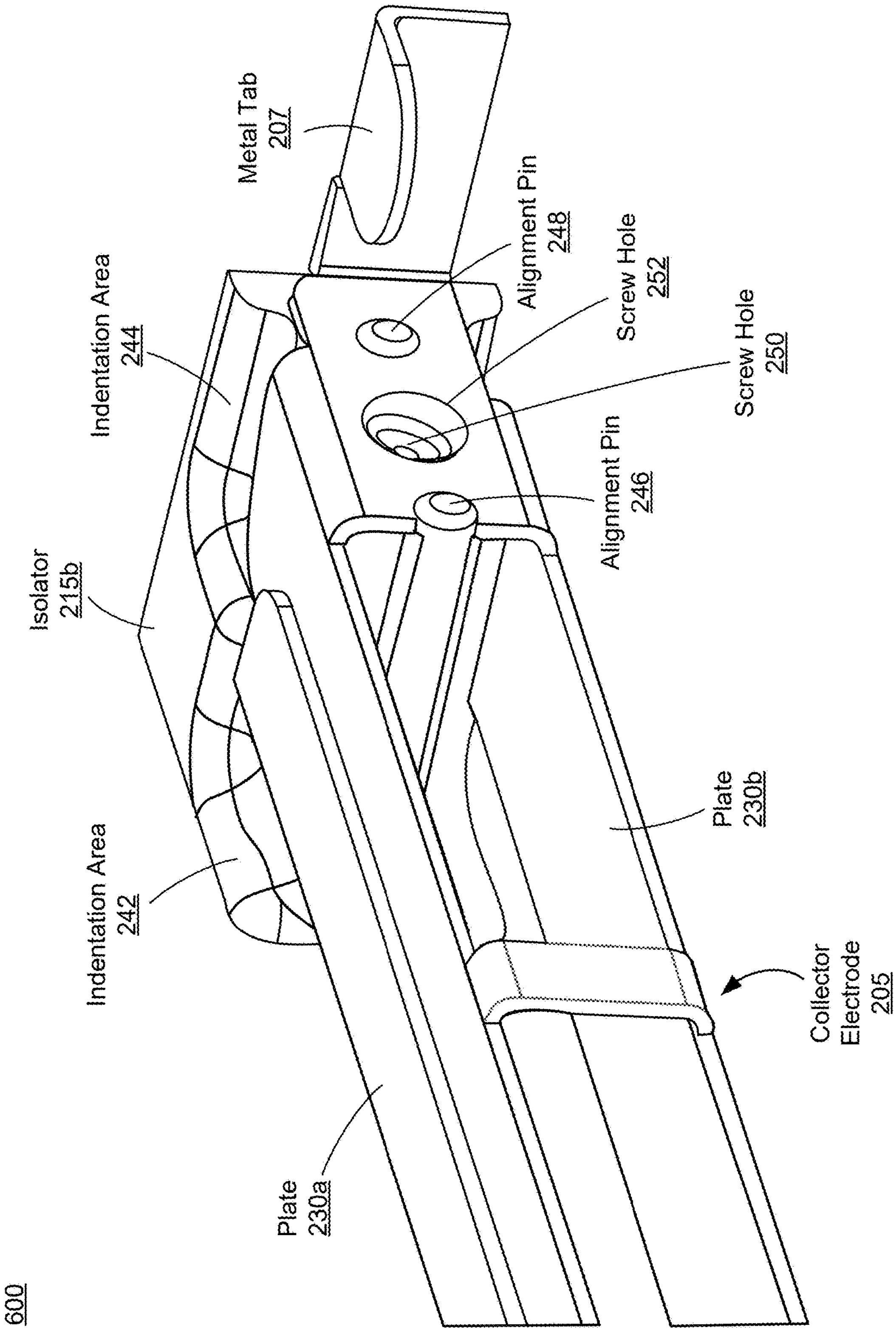
FIG. 6A illustrates a back view of a collector electrode of an EHD air mover apparatus, in accordance with one or more embodiments.

FIG. 6A illustrates a back view 600 of the collector electrode 205, in accordance with one or more embodiments. The collector electrode 205 may be implemented as an electrode of parallel plate type, i.e., the collector electrode 205 may include parallel plates 230*a* and 230*b*. The metal tab 207 (e.g., conductive terminal) may be formed on the back of the collector electrode 205 for connection to the power supply (e.g., negative high-voltage, or HV−) and/or the ground.

The isolator 215*b* may include indentation areas 242 and 244 formed at the top of the isolator 215*b* to facilitate holding the plate 230*a* of the collector electrode 205 in position, as well as to precisely position the plate 230*a* of the collector electrode 205. Similarly, the isolator 215*b* may include indentation areas formed at the bottom of the isolator 215*b* (not shown in FIG. 6A) to facilitate holding the plate 230*b* of the collector electrode 205 in position, as well as to precisely position the plate 230*b* of the collector electrode 205.

The isolator 215*b* may also include alignment pins 246 and 248 that can also be referred to as guide pins. The alignment pins 246 and 248 may be formed on a back side of the isolator 215*a* opposite to the wire of the emitter electrode 210 to facilitate holding the collector electrode 205 in a desired position. The isolator 215*b* may further include a screw hole 250 that is aligned with a corresponding screw hole 252 in the collector electrode 205, which allows the collector electrode 205 to be affixed (i.e., secured) to the isolator 215*b* and held in the desired position and orientation.

Figure 6B:
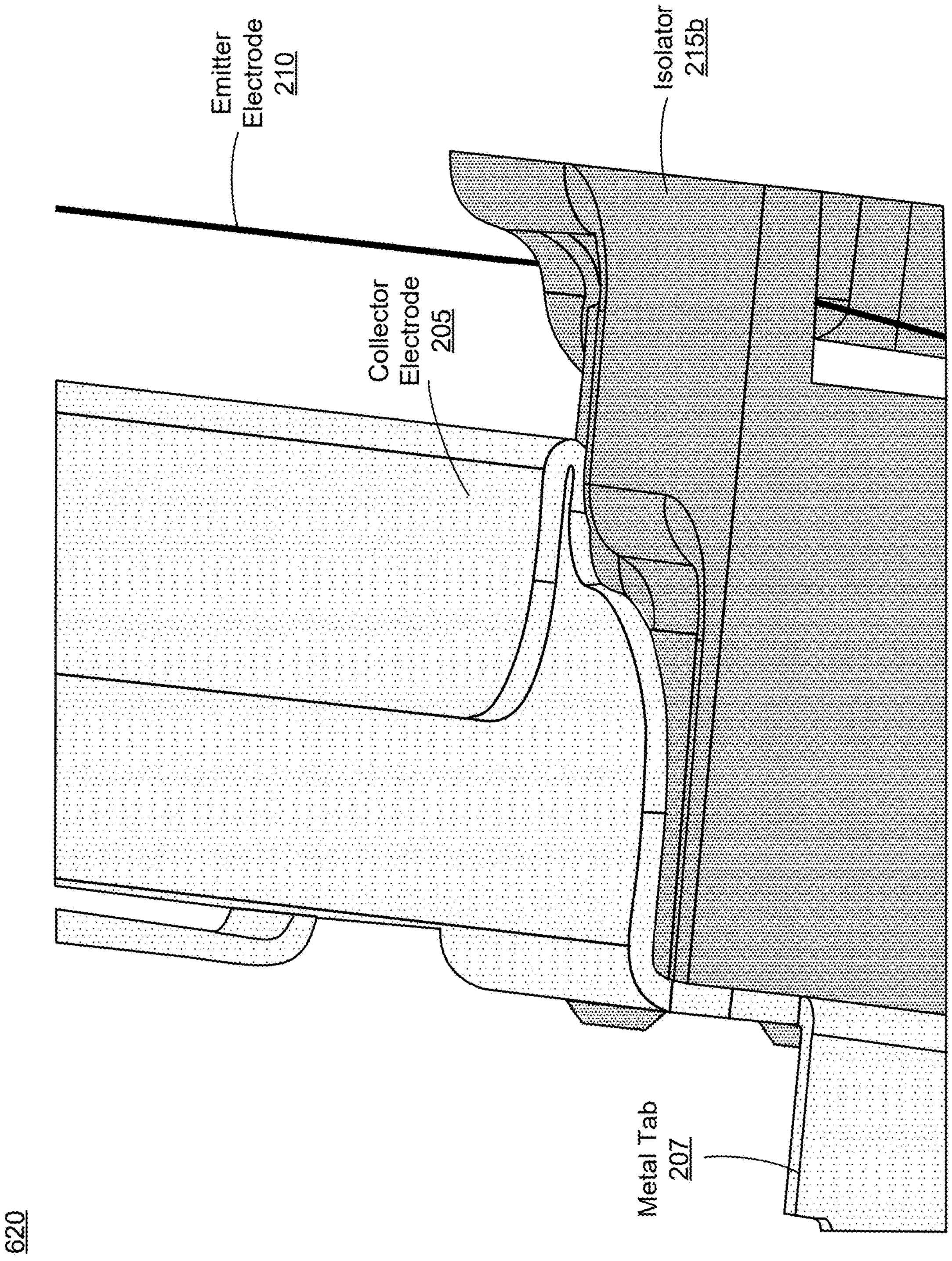
FIG. 6B illustrates a top view of a collector electrode of an EHD air mover apparatus, in accordance with one or more embodiments.

FIG. 6B illustrates a top view 620 of the collector electrode 205, in accordance with one or more embodiments. As shown in FIG. 6B, the collector electrode 205 may be folded to avoid having a sharp edge facing the wire of the emitter electrode 210. In this manner, the electrical field is not concentrated in the area of the collector electrode 205 facing the emitter electrode 210, which would otherwise lead to undesired arcing.

Figure 7A:
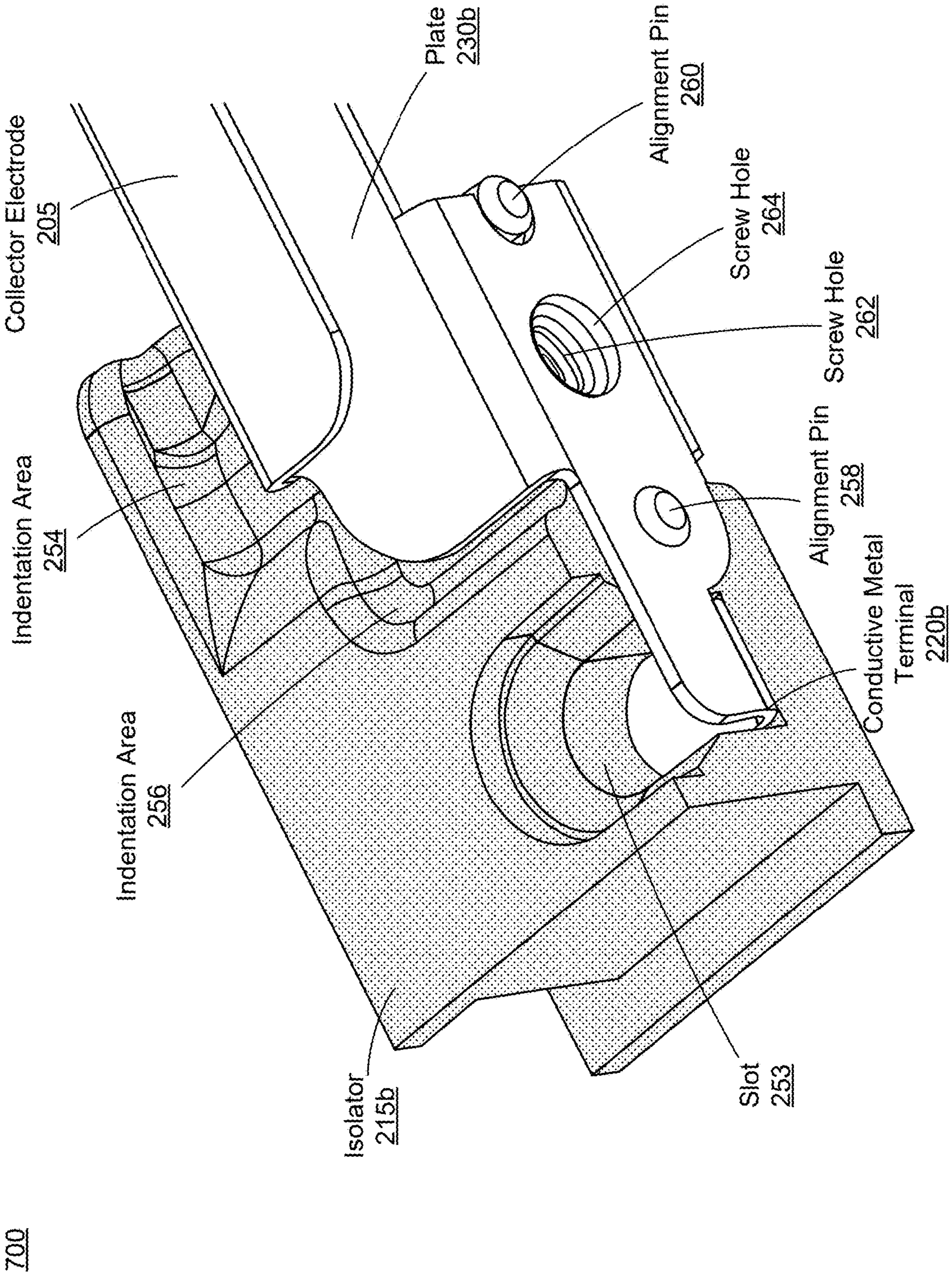
FIG. 7A illustrates a bottom view of a collector electrode affixed to an isolator in an EHD air mover apparatus, in accordance with one or more embodiments.

FIG. 7A illustrates a bottom view 700 of the collector electrode 205 affixed to the isolator 215*b*, in accordance with one or more embodiments. The conductive metal terminal 220*b* (e.g., negative high-voltage terminal, or HV− terminal) for connection to the power supply (e.g., negative high-voltage, or HV−) and/or the ground may be placed into a slot 253 of the isolator 215*b*. The isolator 215*b* may include indentation areas 254 and 256 formed at the bottom of the isolator 215*b* to facilitate holding the plate 230*b* of the collector electrode 205 in position, as well as to precisely position the plate 230*b* of the collector electrode 205.

In the configuration illustrated in FIG. 7A, the isolator 215*b* may also include alignment pins 258 and 260 (or guide pins). The alignment pins 258 and 260 may be formed on a back side of the isolator 215*b* opposite to the wire of the emitter electrode 210 to facilitate holding the collector electrode 205 in a desired position. The isolator 215*b* may further include a screw hole 262 that is aligned with a corresponding screw hole 264 in the collector electrode 205, which allows the collector electrode 205 to be affixed (i.e., secured) to the isolator 215*b* and held in the desired position and orientation.

Figure 7B:
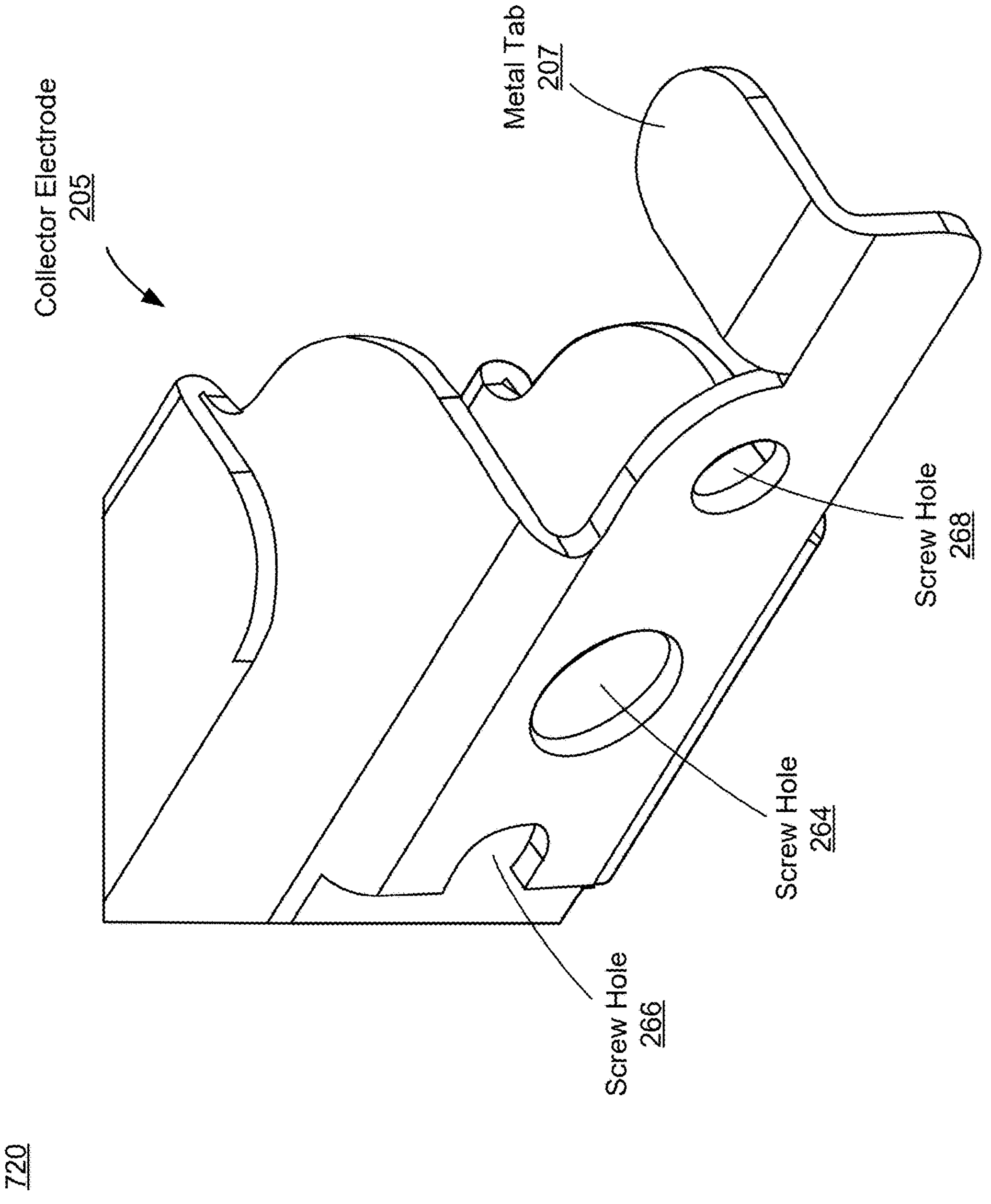
FIG. 7B illustrates a side view of an end portion of a collector electrode of an EHD air mover apparatus, in accordance with one or more embodiments.

FIG. 7B illustrates a side view 720 of an end portion of the collector electrode 205, in accordance with one or more embodiments. The end portion of the collector electrode 205 may be a portion of the collector electrode 225 that is affixed to the isolator 215*b*. As shown in FIG. 7B, the end portion of the collector electrode 205 may include the metal tab 207 for connection to the power supply (e.g., negative high-voltage, or HV−) and/or the ground. As further shown in FIG. 7B, the end portion of the collector electrode 205 may include screw holes 266, 268 that respectively allow the alignment pins 258, 260 to fit through for aligning and holding the isolator 215*b* and the collector electrode 205. The end portion of the collector electrode 205 may further include the screw hole 264 made for aligning with the screw hole 262 of the isolator 215*b*. The alignment of the screw hole 264 of the collector electrode 205 with the screw hole 262 of the isolator 215*b* may allow for the collector electrode 205 to be affixed (i.e., secured) to the isolator 215*b* and held in the desired position and orientation.

Embodiments of the present disclosure are directed to an EHD air mover apparatus that includes a pair of isolators made of one or more non-conductive materials, a collector electrode, an emitter electrode, a first conductive metal terminal, and a second conductive metal terminal. A first end of the collector electrode may be attached to a first isolator of the pair of isolators, a second end of the collector electrode may be attached to a second isolator of the pair of isolators, and the first end of the collector electrode may be opposite to the second end of the collector electrode along a first direction. A first end of the emitter electrode may be attached to the first isolator, a second end of the emitter electrode may be attached to the second isolator, and the first end of the emitter electrode may be opposite to the second end of the emitter electrode along the first direction.

The first conductive metal terminal may be placed in a slot of the first isolator and may be electrically connected to the first end of the emitter electrode. The first conductive metal terminal may be configured for applying a first voltage of a power supply (e.g., positive high-voltage, or HV+). The second conductive metal terminal may be placed in a slot of the second isolator and may be electrically connected to the second end of the emitter electrode. The second conductive metal terminal may be configured for applying a second voltage of the power supply (e.g., negative high-voltage, or HV−). The second conductive metal terminal may also be configured to provide mechanical support and controlled tensioning without electrical connection.

A distance from the emitter electrode to the collector electrode along a second direction orthogonal to the first direction may be equal to or greater than a threshold distance set to prevent an electrical arcing between the collector electrode and the emitter electrode. The distance may correspond to an air gap from the emitter electrode to the collector electrode along an outer surface of each of the first isolator and the second isolator. In some embodiments, the distance from the wire of the emitter electrode to each of the first plate and the second plate of the collector electrode along the second direction is also less than a threshold distance at which a voltage of approximately 3000 V±25% can induce a corona current greater than 500 nA across a 1 mm cross-section of the emitter-collector structure. This condition establishes a balance between maintaining sufficient dielectric clearance to avoid arcing and ensuring that a corona discharge of measurable current is initiated at practical voltage levels.

In some embodiments, the distance from the emitter electrode wire to each of the first plate and the second plate along a second direction orthogonal to the first direction is equal to or greater than a threshold distance selected to prevent electrical arcing between the collector electrode and the emitter electrode. At the same time, the distance may also be less than a maximum value corresponding to a threshold voltage of approximately 3000 V±25%, such that a corona current greater than 500 nA can be induced across a 1 mm cross-section of the emitter-collector structure. This range provides sufficient dielectric clearance to prevent arcing while maintaining efficient initiation of a stable corona discharge.

The collector electrode may be made of one or more conductive materials in a folded shape including a first plate and a second plate parallel to the first plate. The emitter electrode may include a wire made of at least one conductive material. A distance from the wire to each of the first plate and the second plate along a second direction orthogonal to the first direction may be equal to or greater than a threshold distance set to prevent an electrical arcing between the collector electrode and the emitter electrode.

A first saddle formed in the first isolator and a second saddle formed in the second isolator may be configured to hold the wire under tension and equidistant from the first plate and the second plate. The distance from the emitter electrode to the collector electrode may correspond to each of a first distance from the wire to the first plate and a second distance from the wire to the second plate. A first distance from each of the first isolator and the second isolator to each of the first plate and the second plate along the second direction may be equal to or greater than a first threshold distance set to prevent the electrical arcing. A second distance from each of the first isolator and the second isolator to each of the first plate and the second plate along a third direction orthogonal to the second direction may be equal to or greater than a second threshold distance set to prevent the electrical arcing.

At least one of the first end of the collector electrode or the second end of the collector electrode may include a metal tab extending in a direction away from the emitter electrode. The metal tab may be configured as an electrical contact point for the collector electrode to at least one of the power supply or a ground. The collector electrode may be made of one or more metal materials folded back so as to expose a rounded leading edge of the collector electrode toward the emitter electrode, or alternatively, exposed as an opening in the second isolator. In some embodiments, openings in the isolators may provide access to the conductive metal terminals, and the openings may be dimensioned to maintain sufficient electrical isolation such that local electric fields at access points do not disturb operation of the apparatus. The first conductive metal terminal may include a first surface and a second surface at a first angle (e.g., 90°) relative to the first surface of the first conductive metal terminal. The first end of the emitter electrode may be attached to the first surface of the first conductive metal terminal via a first solder connection, weld connection, other equivalent means of electrical and mechanical contact, and the second surface of the first conductive metal terminal may be configured for applying the first voltage of the power supply. The second conductive metal terminal may include a first surface and a second surface at a second angle (e.g., 90°) relative to the first surface of the second conductive metal terminal. The second end of the emitter electrode may be attached to the first surface of the second conductive metal terminal via a second solder, weld, or other connection, the second surface of the second conductive metal terminal may be configured for applying the second voltage of the power supply.

In some embodiments, the second conductive metal terminal comprises an emitter terminal configured to be spring-loaded and compressed into a defined position, the emitter terminal being adapted to receive and secure the emitter electrode via solder, weld, or another electromechanical connection without requiring application of tension to the emitter electrode during attachment, wherein following the attachment, the compression applied to the emitter terminal is released to transfer a tension force to the emitter electrode positioned between terminals, the resulting tension being determined at least in part by material properties of the emitter terminal.

The second conductive metal terminal may be implemented in multiple forms. In one implementation, the second conductive metal terminal includes a first surface and a second surface formed at an angle (for example, approximately 90°) relative to the first surface, with the second end of the emitter electrode being attached to the first surface of the terminal. In this case, the attachment is made through a solder or weld process that applies a controlled tension force to the emitter electrode between about 30 g and 400 g during bonding, thereby ensuring a firm mechanical attachment. In another implementation, the second conductive metal terminal may be replaced by an emitter terminal that incorporates a spring-loading feature. In this arrangement, the emitter electrode is attached to the emitter terminal under minimal tension, and after soldering or welding is complete, the emitter terminal is released to return to a relaxed position. The return force of the spring-loaded emitter terminal applies a defined tension between about 30 g and 400 g to the emitter electrode, thereby establishing consistent mechanical stability.

A hole in the first isolator may be configured for the power supply to access the second surface of the first conductive metal terminal. A hole in the second isolator may be configured for the power supply to access the second surface of the second conductive metal terminal which is an extension of the Collector Electrode.

The EHD air mover apparatus may further include a pair of screws. A first screw of the pair of screws may connect the first end of the collector electrode to the first isolator. A second screw of the pair of screws may connect the second end of the collector electrode to the second isolator.

The slot of the first isolator may be configured for accessing at least two orthogonal surfaces of the first conductive metal terminal. The slot of the second isolator may be configured for accessing at least two orthogonal surfaces of the second conductive metal terminal.

The first isolator may include a first pair of indentation areas on a top surface of the first isolator and a second pair of indentation areas on a bottom surface of the first isolator that is opposite the top surface of the first isolator. The first pair of indentation areas and the second pair of indentation areas may be configured for holding the first end of the collector electrode. The second isolator may include a third pair of indentation areas on a top surface of the second isolator and a fourth pair of indentation areas on a bottom surface of the second isolator that is opposite the top surface of the second isolator. The third pair of indentation areas and the fourth pair of indentation areas may be configured for holding the second end of the collector electrode.

A screw hole in the first isolator may be aligned with a screw hole in the first end of the collector electrode to affix the first end of the collector electrode to the first isolator. A screw hole in the second isolator may be aligned with a screw hole in the second end of the collector electrode to affix the second end of the collector electrode to the second isolator.

A back side of the first isolator opposite to the emitter electrode may include a first pair of alignment pins partially inserted through a pair of holes in the first end of the collector electrode for aligning the first end of the collector electrode. A back side of the second isolator opposite to the emitter electrode may include a second pair of alignment pins partially inserted through a pair of holes in the second end of the collector electrode for aligning the second end of the collector electrode.

In one or more embodiments, the isolators are further configured with precise alignment and fastening features. A screw hole in the first isolator may be aligned with a corresponding screw hole in the first end of the collector electrode to affix the first end of the collector electrode to the first isolator. A back side of the first isolator, opposite to the emitter electrode, may include a first pair of alignment pins that extend partially through a pair of holes formed in the first end of the collector electrode, thereby ensuring accurate positioning. Similarly, a screw hole in the second isolator may be aligned with a screw hole in the second end of the collector electrode to affix the second end of the collector electrode to the second isolator. The back side of the second isolator, opposite to the emitter electrode, may also include a second pair of alignment pins partially inserted through a pair of holes in the second end of the collector electrode to ensure proper alignment and secure mounting.

Additional Considerations

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or. " For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. An electro-hydrodynamic (EHD) air mover apparatus, comprising:

a pair of isolators comprising one or more non-conductive materials;

a collector electrode, wherein:

the collector electrode comprises a first end of the collector electrode and a second end of the collector electrode, the first end of the collector electrode is attached to a first isolator of the pair of isolators, the second end of the collector electrode is attached to a second isolator of the pair of isolators, and the first end of the collector electrode is opposite to the second end of the collector electrode along a first direction;

an emitter electrode, wherein the emitter electrode comprises a first end of the emitter electrode and a second end of the emitter electrode, wherein:

the first end of the emitter electrode is attached to the first isolator, the second end of the emitter electrode is attached to the second isolator, the first end of the emitter electrode is opposite to the second end of the emitter electrode along the first direction, and a first distance from the emitter electrode to the collector electrode along a second direction orthogonal to the first direction is equal to or greater than a first threshold distance, wherein the first threshold distance prevents electrical arcing between the collector electrode and the emitter electrode;

a first conductive metal terminal disposed in a slot of the first isolator, wherein:

the first conductive metal terminal is electrically connected to the first end of the emitter electrode, the first conductive metal terminal comprises a first surface of the first conductive metal terminal and a second surface of the first conductive metal terminal at a first angle relative to the first surface of the first conductive metal terminal, the first end of the emitter electrode is attached to the first surface of the first conductive metal terminal via an electrical and mechanical connection, the second surface of the first conductive metal terminal is configured to apply a first voltage of the power supply, and the first isolator comprises an opening for securing the first isolator to a mounting surface; and a second conductive metal terminal disposed in a slot of the second isolator, wherein:

the second conductive metal terminal is electrically connected and mechanically secured to the second end of the emitter electrode, the second conductive metal terminal comprises a first surface and a second surface at a second angle relative to the first surface of the second conductive metal terminal, the second end of the emitter electrode is attached to the first surface of the second conductive metal terminal, the second surface of the second conductive metal terminal is configured to establish a mechanical connection and allow for a predetermined parallel distance of the emitter electrode to collector electrode surfaces.

2. The EHD air mover apparatus of claim 1, wherein the parallel distance corresponds to an air gap from the emitter electrode to the collector electrode along an outer surface of the first isolator and the second isolator.

3. The EHD air mover apparatus of claim 1, wherein:

the second conductive metal terminal comprises an emitter terminal that is configured to be spring-loaded and compressed, and the emitter terminal is configured to receive and secure the emitter electrode via solder, weld, or another electromechanical connection without requiring application of tension to a wire during attachment.

4. The EHD air mover apparatus of claim 1, wherein:

the first isolator comprises a hole, wherein the power supply is configured to connect to the second surface of the first conductive metal terminal and provide a voltage to the emitter electrode; and the second isolator comprises a feature for configured to allow the power supply to access either via a hole in the second isolator which provides access to a surface of the collector electrode which is positioned within a top surface of the hole or at a position adjacent to the isolator where a surface of the collector electrode.

5. The EHD air mover apparatus of claim 1, further comprising:

a first screw connecting the first end of the collector electrode to the first isolator; and a second screw connecting the second end of the collector electrode to the second isolator.

6. The EHD air mover apparatus of claim 1, wherein:

the slot of the first isolator is configured to receive at least two orthogonal surfaces of the first conductive metal terminal; and the slot of the second isolator is configured to receive at least two orthogonal surfaces of the second conductive metal terminal.

7. The EHD air mover apparatus of claim 1, wherein:

the first isolator comprises a first pair of indentation areas on a top surface of the first isolator and a second pair of indentation areas on a bottom surface of the first isolator that is opposite the top surface of the first isolator, wherein the first pair of indentation areas and the second pair of indentation areas are configured to hold the first end of the collector electrode; and the second isolator comprises a third pair of indentation areas on a top surface of the second isolator and a fourth pair of indentation areas on a bottom surface of the second isolator that is opposite the top surface of the second isolator, wherein the third pair of indentation areas and the fourth pair of indentation areas are configured to hold the second end of the collector electrode.

8. The EHD air mover apparatus of claim 1, wherein:

a screw hole in the first isolator is aligned with a screw hole in the first end of the collector electrode, wherein the first isolator is configured to be affixed to the collector electrode using the screw hole in the first isolator and the screw hole in the first end of the collector electrode; and a screw hole in the second isolator is aligned with a screw hole in the second end of the collector electrode, wherein the second isolator is configured to be affixed to the collector electrode using the screw hole in the second isolator and the screw hole in the second end of the collector electrode.

9. The EHD air mover apparatus of claim 1, wherein:

the first isolator comprises a back side opposite to the emitter electrode, wherein the back side of the first isolator comprises a first pair of alignment pins configured to be partially inserted through a pair of holes in the first end of the collector to align the first end of the collector electrode the back side of the first isolator; and the second isolator comprises a back side opposite to the emitter electrode, wherein the back side of the second isolator comprises a second pair of alignment pins configured to be partially inserted through a pair of holes in the second end of the collector electrode to align the second end of the collector electrode with the back side of the second isolator.

10. The EHD air mover apparatus of claim 1, wherein:

the collector electrode comprises one or more conductive materials and is in a folded shape, wherein the collector electrode comprises a first plate and a second plate parallel to the first plate; and the emitter electrode comprises a wire comprising at least one conductive material.

11. The EHD air mover apparatus of claim 10, wherein a first saddle formed in the first isolator and a second saddle formed in the second isolator are configured to hold the wire under tension equidistant from the first plate and the second plate.

12. The EHD air mover apparatus of claim 10, wherein the first distance from the emitter electrode to the collector electrode corresponds to each of a first distance from the wire to the first plate and a second distance from the wire to the second plate.

13. The EHD air mover apparatus of claim 10, wherein:

a second distance from each of the first isolator and the second isolator to each of the first plate and the second plate along the second direction is equal to or greater than a second threshold distance set to prevent the electrical arcing; and a third distance from each of the first isolator and the second isolator to each of the first plate and the second plate along a third direction orthogonal to the second direction is equal to or greater than a third threshold distance set to prevent the electrical arcing.

14. The EHD air mover apparatus of claim 1, wherein at least one of the first end of the collector electrode or the second end of the collector electrode includes a metal tab extending away from the emitter electrode, wherein the metal tab is configured to electrically contact the collector electrode to at least one of the power supply or a ground.

15. The EHD air mover apparatus of claim 1, wherein the collector electrode comprises one or more folded back metal materials, and wherein the collector electrode comprises a rounded leading edge exposed toward the emitter electrode by the one or more folded back metal materials.

16. An electro-hydrodynamic (EHD) air mover apparatus, comprising:

a pair of isolators comprising one or more non-conductive materials;

a collector electrode, wherein:

the collector electrode comprises a first end of the collector electrode and a second end of the collector electrode, the first end of the collector electrode is attached to a first isolator of the pair of isolators, the second end of the collector electrode is attached to a second isolator of the pair of isolators, and the first end of the collector electrode is opposite to the second end of the collector electrode along a first direction;

an emitter electrode, wherein the emitter electrode comprises a first end of the emitter electrode and a second end of the emitter electrode, wherein:

the first end of the emitter electrode is attached to the first isolator, the second end of the emitter electrode is attached to the second isolator, and the first end of the emitter electrode is opposite to the second end of the emitter electrode along the first direction;

a first conductive metal terminal disposed in a slot of the first isolator, wherein:

the first conductive metal terminal is electrically connected to the first end of the emitter electrode, the first conductive metal terminal comprises a first surface of the first conductive metal terminal and a second surface of the first conductive metal terminal at a first angle relative to the first surface of the first conductive metal terminal, the first end of the emitter electrode is attached to the first surface of the first conductive metal terminal via an electrical and mechanical connection, the second surface of the first conductive metal terminal is configured to apply the first voltage of a power supply, and the first isolator comprises an opening for securing the first isolator to a mounting surface; and a second conductive metal terminal disposed in a slot of the second isolator, wherein:

the second conductive metal terminal comprises a first surface and a second surface at a second angle relative to the first surface of the second conductive metal terminal, the second end of the emitter electrode is attached to the first surface of the second conductive metal terminal, the second surface of the second conductive metal terminal is configured to establish a mechanical connection to the emitter electrode and allow for a predetermined parallel distance of the emitter electrode to collector electrode surfaces.

17. The EHD air mover apparatus of claim 16, wherein:

the collector electrode comprises one or more conductive materials in a folded shape, wherein the one or more conductive materials comprises a first plate and a second plate parallel to the first plate; and the emitter electrode comprises a wire made of at least one conductive material.

18. The EHD air mover apparatus of claim 17, wherein a distance from the wire to each of the first plate and the second plate along a second direction orthogonal to the first direction is:

equal to or greater than a threshold distance set to prevent an electrical arcing between the collector electrode and the emitter electrode, and less than a maximum distance where a threshold voltage of 3000V is configured to induce a corona current of greater than 500 nA of current across a 1 mm cross section of emitter electrode to collector electrode structure.

19. The EHD air mover apparatus of claim 16, wherein:

the second surface of the first conductive metal terminal is configured to apply a first voltage of a power supply; and one of:

the second end of the emitter electrode is attached to the second isolator to establish a firm mechanical attachment under a tension as applied during a solder or weld process between 30 and 400 g force, or the second conductive metal terminal comprises an emitter terminal comprising a spring-loading feature configured to attach the emitter electrode to the emitter terminal.

20. The EHD air mover apparatus of claim 16, wherein:

a screw hole in the first isolator is aligned with a screw hole in the first end of the collector electrode, wherein the first isolator is configured to be affixed to the collector electrode using the screw hole in the first isolator and the screw hole in the first end of the collector electrode; and a screw hole in the second isolator is aligned with a screw hole in the second end of the collector electrode, wherein the second isolator is configured to be affixed to the collector electrode using the screw hole in the second isolator and the screw hole in the second end of the collector electrode to the second isolator.

21. The EHD air mover apparatus of claim 16, wherein a back side of the first isolator opposite to the emitter electrode includes a first pair of alignment pins partially inserted through a pair of holes in the first end of the collector electrode for aligning the first end of the collector electrode.

* * * * *